United States Patent [19]
Li et al.

[11] Patent Number: 6,067,568
[45] Date of Patent: May 23, 2000

[54] AUTOMATIC SETUP OF SERVICES FOR COMPUTER SYSTEM USERS

[75] Inventors: Jim Y. Li, San Francisco; Linda Y. Chang, Milpitas; Robert B. Mann, Foster City, all of Calif.

[73] Assignee: International Business Machines Corporation, Armonk, N.Y.

[21] Appl. No.: 08/762,736

[22] Filed: Dec. 10, 1996

[51] Int. Cl.[7] .................................................. G06F 13/00
[52] U.S. Cl. ............................................................ 709/223
[58] Field of Search ....................... 364/DIG. 1 MS File, 364/DIG. 2 MS File; 395/200.3, 200.32, 200.33, 200.47, 200.5, 200.51, 200.52, 200.53; 709/200, 202, 203, 217, 220, 221, 222, 223

[56] References Cited

U.S. PATENT DOCUMENTS 5,459,863  10/1995  Taylor ...................................... 395/600
5,734,831   3/1998  Sanders .............................. 395/200.53

OTHER PUBLICATIONS

Fiedler et al. "UNIX® System V Release 4 Administration Second Edition" SAMS Publishing; pp. 78–80, 129–142, 180–181, 1994.

Primary Examiner—Robert B. Harrell
Attorney, Agent, or Firm—Anthony N. Magistrale; Andrew J. Dillon

[57] ABSTRACT

Various services within a computer system are automatically set up as users are added to the system through a directory service. A user template is selected that already contains default settings for each of the services available on a system such as e-mail and a web service. Various user templates exist and contain different default settings for each available service depending upon the user. Default settings from each service are copied onto a new user form. Next, default settings from the selected user template are copied to the new user form and override any conflicting default settings from the services. The default settings from the new user form are used to automatically set up and enable each service for the new user. The data from the new user form is copied into a central account database that contains rows of user information, with columns corresponding to a particular service. Each user is automatically enabled for use with available services including an e-mail account and a generated web page. When an individual user then logs on to the computer system, the services available have already been set up for that individual user. If the user has any special privileges such as being an administrator, a webmaster, or a postmaster then that user may begin performing that role.

20 Claims, 19 Drawing Sheets

System Administration Home Page

Fig. 6

Netscape: Administrator: Personnel

Location: http://207.76.205.40/agent/account/acct.cgi

The administrator's password is still the same as it was when you first got the InterJet. I recommend that you change it to make your InterJet more secure. Click on the Admin entry, then click on Edit to change the password. Organization name not filled in... Click on 'organization'.

Employee

| Select | Admin | Username | Real name |
|--------|-------|----------|-----------|
| ○ | | | *Administrator* |
| ○ | | admin | administrator |
| ● | | doug | Doug Brent |
| ○ | | | *Employee* |
| ○ | | test1 | test1 test1 |

New   Edit   Del users
associates
organization

Directory Service

Document: Done...

Adding a User Account

Editing a User Account

Deleting a User Account

AUTOMATIC SETUP OF SERVICES FOR COMPUTER SYSTEM USERS

CROSS REFERENCE TO RELATED APPLICATIONS

This application is related to U.S. patent application Ser. No. 08/762,737, entitled "Automatic Configuration for Internet Access Device," filed on the same date herewith and which is hereby incorporated by reference.

FIELD OF THE INVENTION

The present invention relates generally to networked computer systems. More specifically, the present invention relates to the automatic configuration of user services on such computer systems.

BACKGROUND OF THE INVENTION

In recent years, the popularity of the Internet has been increasing dramatically. Every day, more and more home users, small business users and large corporations are connecting to the Internet to improve communication. The term "Internet" (upper-case "I") refers to that particular global communications network that is in use around the world and that grew out of a U.S. Department of Defense funded research project named the ARPANet. Currently, most of the Internet is commercially owned and is an extremely complex, highly redundant network of telecommunications circuits that are connected together with routers. The "Internet" refers to a particular network of communications networks, while, in general, any interconnection of networks may be termed an "internet" (lower-case "i"). The "Internet" is one example of an "internet". Currently, the Internet is used for a variety of services including communication, education, news, advertising, reference materials, broadcast like media, financial services, and other.

Two such services available for use on the Internet include electronic mail and web publishing. An electronic mail service allows users to communicate within a company or over the Internet to remote locations. A web publishing service allows users to publish hypertext, multi-media documents and information, formatted in HTML (hyper-text markup language), to be transmitted to clients via HTTP (hyper-text transfer protocol). HTTP servers connected via the Internet are commonly referred to as the "World Wide Web", "WWW", or simply the "web". In other words, a web publishing service allows users to publish a "web site" either internally, or externally for public viewing by others on the Internet. It is contemplated that a web publishing service may also utilize other formats and protocols than HTML and HTTP, and may span other servers and networks, and not necessarily the Internet. Before a user may take advantage of either an electronic mail service or a web publishing service however, a user must be set up on, and be configured for, each of these services.

Traditionally, the set up and administration of users on a computer system has been a task separate from the set up and configuration of various services that may be utilized by users on the computer system. Typically, a system administrator is responsible for identifying new users of the computer system, assigning to them an account name, entering basic user information, and then manually setting rudimentary access privileges for certain directories on the computer system. If additional services are to be implemented on the computer system, then these additional services must be bought separately, installed separately, and then each service must be manually configured for each user of the computer system. These services might include electronic mail, web publishing, news or financial services, or local area network (LAN) services. The separate installation and manual configuration of each service for each user is a time consuming, tedious and error prone process that can be a headache for most system administrators.

For example, the set up of an electronic mail service requires adding each new user individually, and setting numerous default parameters manually such as subscriber lists, address books, address groups, postmaster privileges, and other settings that may be unique to an individual user. For web publishing services, each user must also be configured manually. The system administrator must provide web directories for each user, set permissions, and set other default parameters. In addition, should the company or the user desire a public or internal web site, the content of the site must also be authored manually by either the system administrator by a user. Creating a web site from scratch can be a difficult process for the average employee in a company who is unfamiliar with web authoring software or the location of the web site directories. Even the addition of a local area network requires default parameters to be set for each user regarding system security, centralized authentication, and other parameters. Again, a system administrator must set up an account for each user for each of these services individually. Furthermore, as each of these services are separate and not integrated, each service has a different user interface, different terminology and different procedures for configuring an individual user.

Therefore, a software tool is desirable that would provide for an integrated approach to configuring various services for individual users of a computer system, and that would automatically configure each of the services for each user upon entering basic user information.

SUMMARY OF THE INVENTION

An embodiment of the present invention allows various services within a computer system to be automatically setup as users are added to the system through a directory service. A particular user template is selected that already contains parameters and values (default settings) for each of the services available on a system such as e-mail and a web service. User templates may exist for various types of users on the system and may contain different parameters and values for each available service depending upon the user. The default settings are copied to a new user form for the new user. The default settings from the new user form are then used to automatically set up and enable each service for the new user.

In one embodiment, an agent registry is queried to determine available services. Then these available services copy default settings onto a new user form. The default settings may be overridden by any conflicting default settings from the selected user template. The data from the new user form is also copied into a central account database. The account database contains rows of user information, with columns corresponding to a particular service and containing parameters and values for each service. A header information column contains personnel type information for each user along with a unique identifier. Thus, a central, integrated database exists for holding all the settings for a particular user for all services available within a computer system. Processes such as adding a user, editing or deleting are made much simpler. In addition, by simply adding basic information about a user, that user is automatically enabled for use with available services including an e-mail account and a generated web page.

When an individual user then logs on to the computer system, the services available have already been set up for that individual user. For example, the user may begin using the electronic mail immediately as any required e-mail settings have been set. In addition, the user may begin browsing through on-site or off-site web pages as any permissions and other settings have been set for using the web service. Additionally, a simple internal web site for that user has been created. Also, if that user has been designated as having any special responsibilities or privileges such as being an administrator, a webmaster, a postmaster, or other, then that user may begin performing that role. Additionally, if any other services are available such as a news service or a banking service, then that user has already been set up to immediately begin using that service.

BRIEF DESCRIPTION OF THE DRAWINGS

The invention, together with further advantages thereof, may best be understood by reference to the following description taken in conjunction with the accompanying drawings in which:

FIG. 6 is a screen shot depicting an embodiment of a user interface for a directory service.

DETAILED DESCRIPTION OF THE INVENTION

When a new user is added by a system administrator to a computer system, default parameters are automatically set for that user for selected services. The actual services that are automatically configured may be widely varied, but by way of example may include such services as electronic mail, web publishing, system services, news and financial services, etc. A new user will then be able to immediately begin using these services and may also be alerted or prompted by any of these services when the user logs on to the computer system for the first time. In one embodiment, the present invention is embodied in an Internet access device as depicted in FIGS. 1, 2 and 3.

Figure 1:
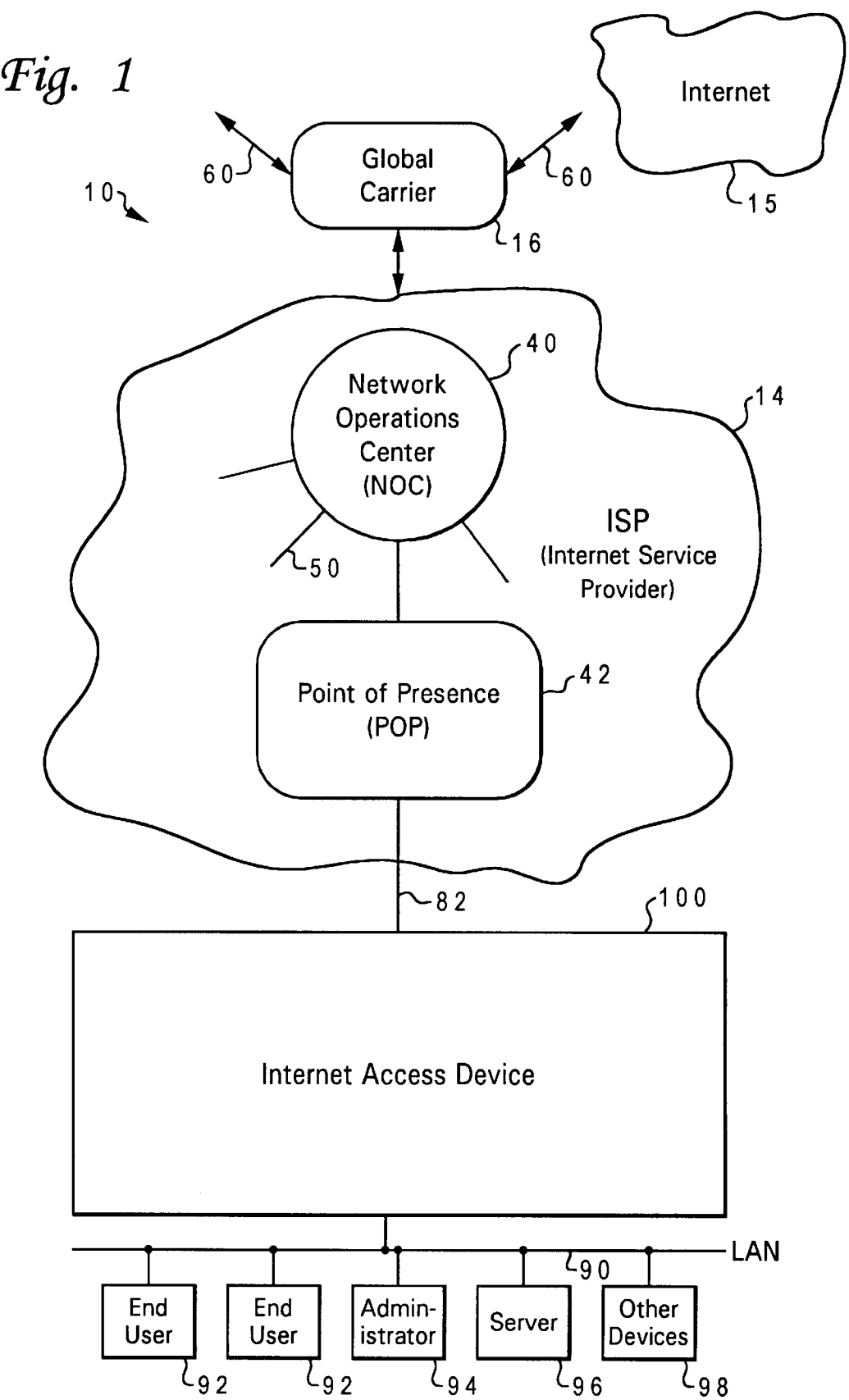
FIG. 1 illustrates an Internet access device connecting a local area network with the Internet for communication.

FIG. 1 illustrates an arrangement 10 in which an Internet access device 100 facilitates communication between end users 92–98 and the Internet 15. Internet access device 100 connects to a point of presence (POP) 42 of an Internet service provider 14 via a communications line 82, which in turn connects to a global carrier 16. Internet service provider includes an IP network 50 with links to other POPs. Global carrier 16 is a carrier such as MCI™ or SPRINT™ that has links to other global carriers and to the Internet via communications lines 60. In this fashion, access is provided to the Internet for a customer site having an Internet access device.

In one embodiment, Internet access device 100 connects to a local area network (LAN) 90 at a customer site. LAN 90 is typically an Ethernet LAN of a corporate or other customer. LAN 90 may connect end users 92, an administrator 94, a server 96, and any number of other devices 98. End users 92 may be a wide variety of users using a wide variety of computing devices. By way of example, end users 92 may use a single personal computer, a network computer, a laptop computer, a workstation, any type of super computer, or any other type of computer used by a user or operating on its own to request, gather, process, send or display information. The administrator 94 is typically a computer used by a system administrator or the like to monitor and administer the LAN 90. Server 96 may be any type of server such as an e-mail server, file server, or other server used for storing information which may be accessed by users on the LAN 90. Other devices 98 may include printers, routers, facsimile machines, gateways, etc.

Figure 2:
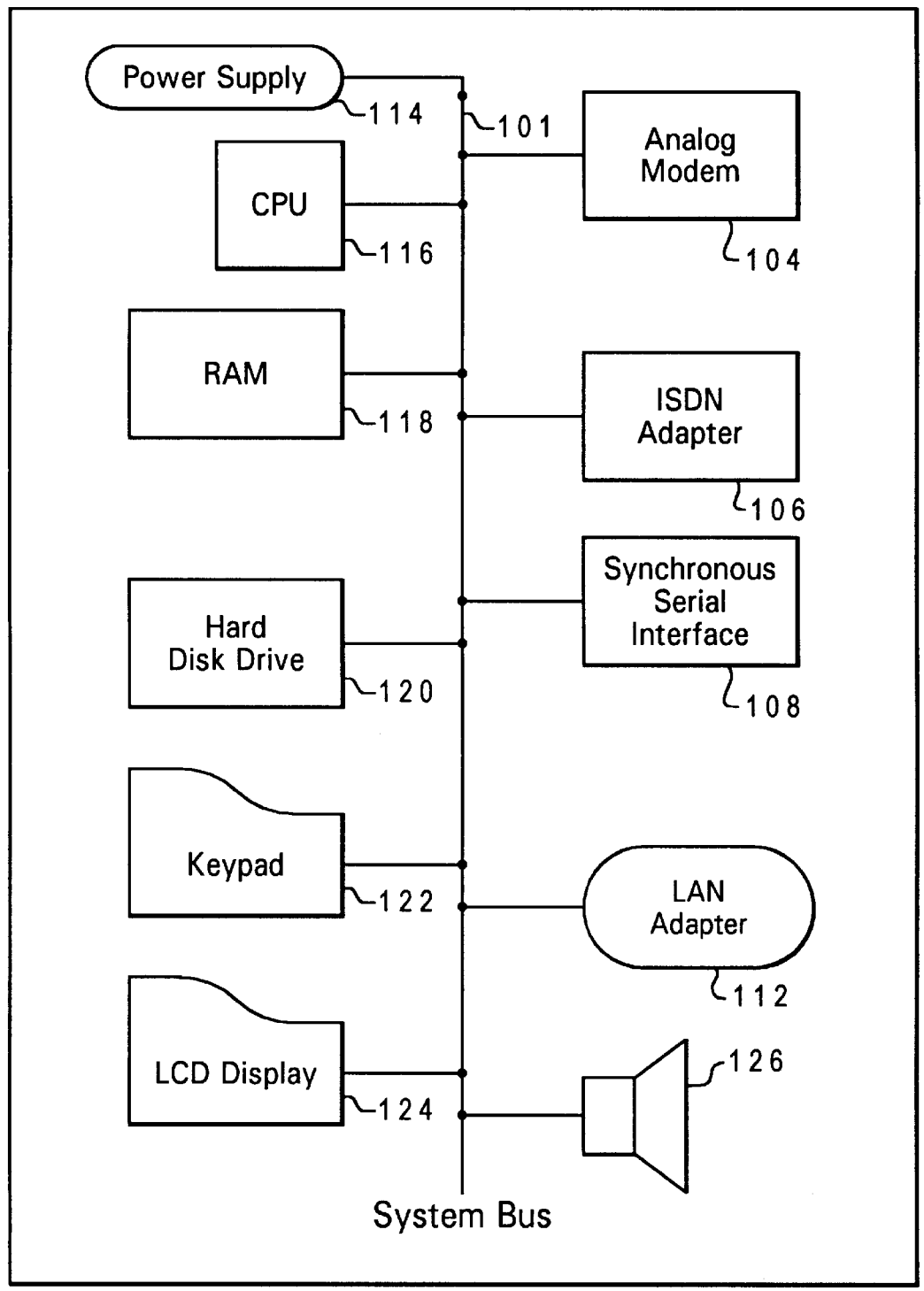
FIG. 2 illustrates an embodiment of an Internet access device.
Figure 3:
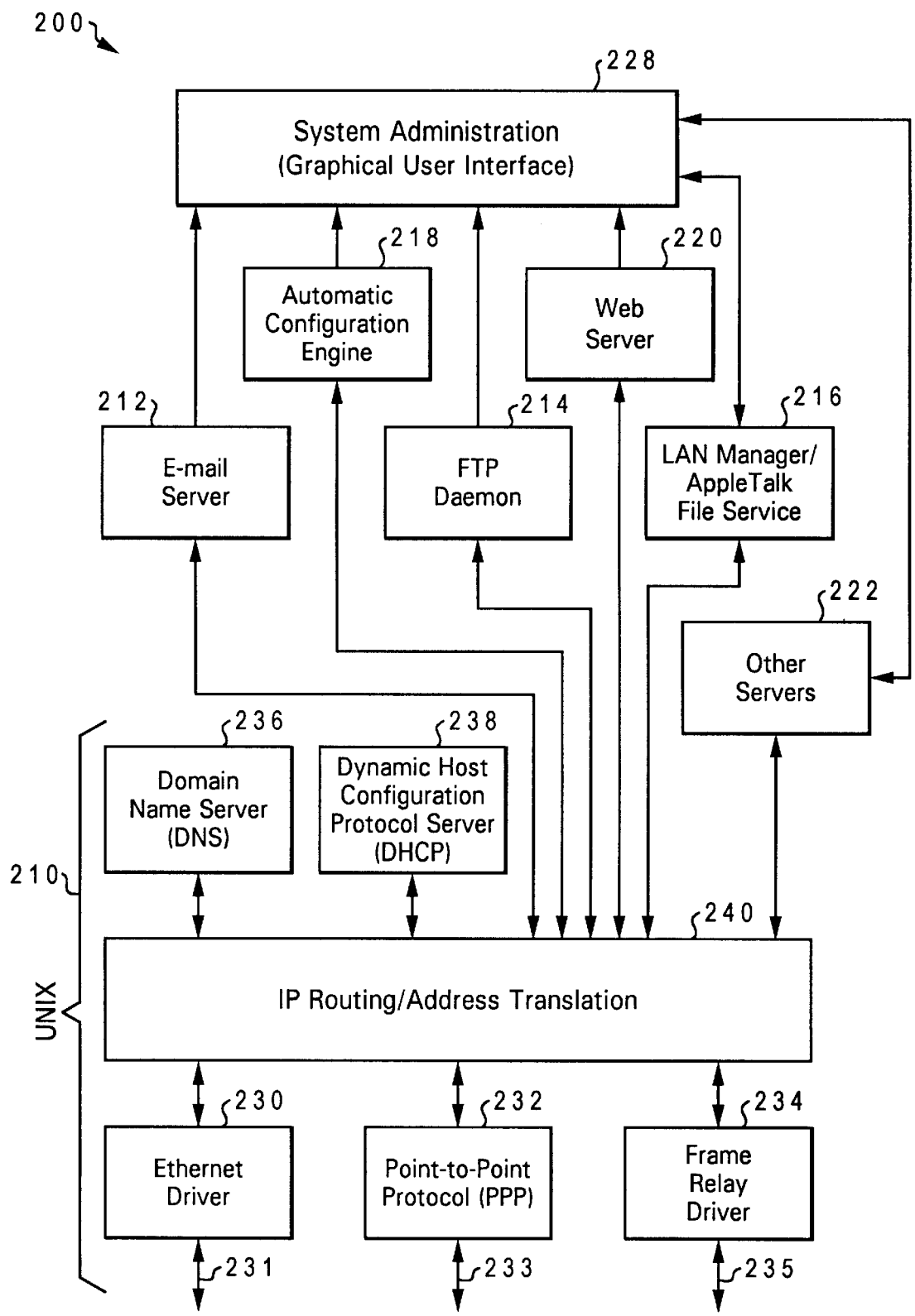
FIG. 3 illustrates the software architecture for an embodiment of an Internet access device.

FIG. 2 shows in greater detail an embodiment of the hardware architecture of the Internet access device 100 shown in FIG. 1. Internet access device 100 includes a system bus 101 to which are connected various devices such as an analog modem 104, an ISDN adapter 106, a synchronous serial interface 108, an Ethernet LAN adapter 112, a power supply 114, a CPU 116, RAM 118, a hard disk drive 120, a keypad 122, an LCD display 124, and a speaker 126.

Typically, analog modem 104 is present in the Internet access device, while devices 106 and 108 may be present if the customer desires one of these types of connections to the Internet. Analog modem 104 may be any suitable analog modem used for communicating over an analog line. By way of example, analog modem 104 is a V.34 28.8 Kbps modem. ISDN adapter 106 may be any suitable ISDN adapter used for communicating over an ISDN line. Synchronous serial interface 108 may be any suitable device used for communicating via a high-speed serial port, and in one embodiment is arranged for communicating using a frame relay packet based interface standard. In one embodiment, Internet access device 100 acts as a frame relay access device (FRAD) when communication using frame relay technology is desired. It is contemplated that other communications interface devices such as 104, 106 and 108 may be used within the Internet access device 100 in order to communicate over a particular type of communication line and using a particular protocol.

LAN adapter 112 may be any suitable device for providing an interface between the Internet access device 100 and a LAN 90. By way of example, LAN adapter 112 is based upon a LocalTalk or a token ring standard. In one embodiment, LAN adapter 112 is for an Ethernet LAN with an integral 4-port 10BaseT hub. Internet access device 100 also includes a power supply 114 that includes a battery backup. CPU (central processing unit) 116 may be any suitable CPU and in one embodiment is an Intel 80486 CPU. RAM 118 provides random access memory used to store temporary data such as routing tables, packet buffers, program storage, etc. for the Internet access device. Hard disk drive 120 may be any suitable hard disk, and in one embodiment is a 1.2 GB IDE hard disk drive used for storing user information such as accounts, electronic mail, web pages, etc.

Keypad 122 may be any suitable keypad for entering numbers and information by a user to the Internet access device. Preferably, keypad 122 is an 18 key keypad including a numeric keypad similar to that found on a push button telephone, and other keys for inputting information to the Internet access device. LCD display 124 includes a 128×64 pixel LCD display for presenting information to the user, along with status lights indicating the status of the Internet access device. These status lights include information such as power, system activity, disk activity, LAN activity, and WAN activity. Speaker 126 is any suitable speaker for presenting audible information to a user.

FIG. 3 illustrates an embodiment of the software architecture 200 of the Internet access device 100 of FIG. 2. The software architecture 200 includes an operating system 210 that communicates with each of an e-mail server 212, an FTP daemon 214, a LAN Manager/AppleTalk file server 216, an automatic configuration engine 218, a web server 220, and other servers 222. These elements 212–222 are each in communication with a system administration module 228 that uses a graphical user interface.

Operating system 210 may be any suitable operating system. By way of example, one embodiment of the operating system 210 is the BSD UNIX operating system. This operating system 210 includes an Ethernet driver 230, PPP (point to point protocol) software 232, and a frame relay driver 234 in communication with an IP Routing/address translation module 240. Ethernet driver 230 communicates over line 231 to an Ethernet card. PPP software communicates over line 233 to either a modem or an ISDN adapter. Frame relay driver 234 communicates over line 235 to a synchronous serial interface card. The address translation module 234 allows for both host (1–N) and network (N—N) address translation. The module 240 is also in communication with a domain name server (DNS) and a dynamic host configuration protocol (DHCP) server 238 which supply appropriate connectivity protocols to the Internet. The IP routing may be performed by any suitable routing software used for receiving information over the Internet and routing it to the appropriate device on LAN 90. By way of example, a GateD router with support for OSPF, RIP and BGP routing protocols may be used.

E-mail server 212 provides e-mail service both internally to users of a LAN 90 of a company, and also externally to the world via the Internet. Every user on the LAN 90 is provided with their own unique e-mail address. FTP (file transfer protocol) daemon 214 is used for both internal and external file storage and transfer using industry standard Internet file transfer protocols. LAN Manager/AppleTalk file server 216 is a file server providing a central location by which users may exchange files. Automatic configuration engine 218 provides for the automatic configuration of the Internet access device 100 for communication with the Internet. An aspect of automatic configuration engine 218 is disclosed in greater detail in U.S. Patent Application entitled "Automatic Configuration for Internet Access Device" referenced above.

Web server 220 may be any suitable web server for providing both internal and public web pages for not only a company, but also for each user on the LAN 90. In one embodiment, web server 220 is an Apache HTTP web server. Other servers 222 may include such servers as directory servers, news servers, catalog servers, search engines, proxy servers, authentication servers, etc.

System administration module 228 provides a graphical user interface by which a system administrator and/or individual users may access the Internet access device in order to manage e-mail and web pages, perform system administration, allow access by individual users, and in general monitor and support the functioning of the Internet access device by users on the LAN 90. In one embodiment, system administration module 222 uses an HTML-based animated user interface for use with either Netscape NAVIGATOR™ or Microsoft INTERNET EXPLORER™ that allows all-in-one administration from any desktop and from any platform. System administration module 228 also provides for self-maintenance via an agent based metaphor, automated backups of any user data to any workstation on the LAN 90 or to the ISP, automated software management for software updates, and automated log and audit management. An aspect of system administration module 228 will be discussed in more detail below with reference to the following figures.

Figure 4:
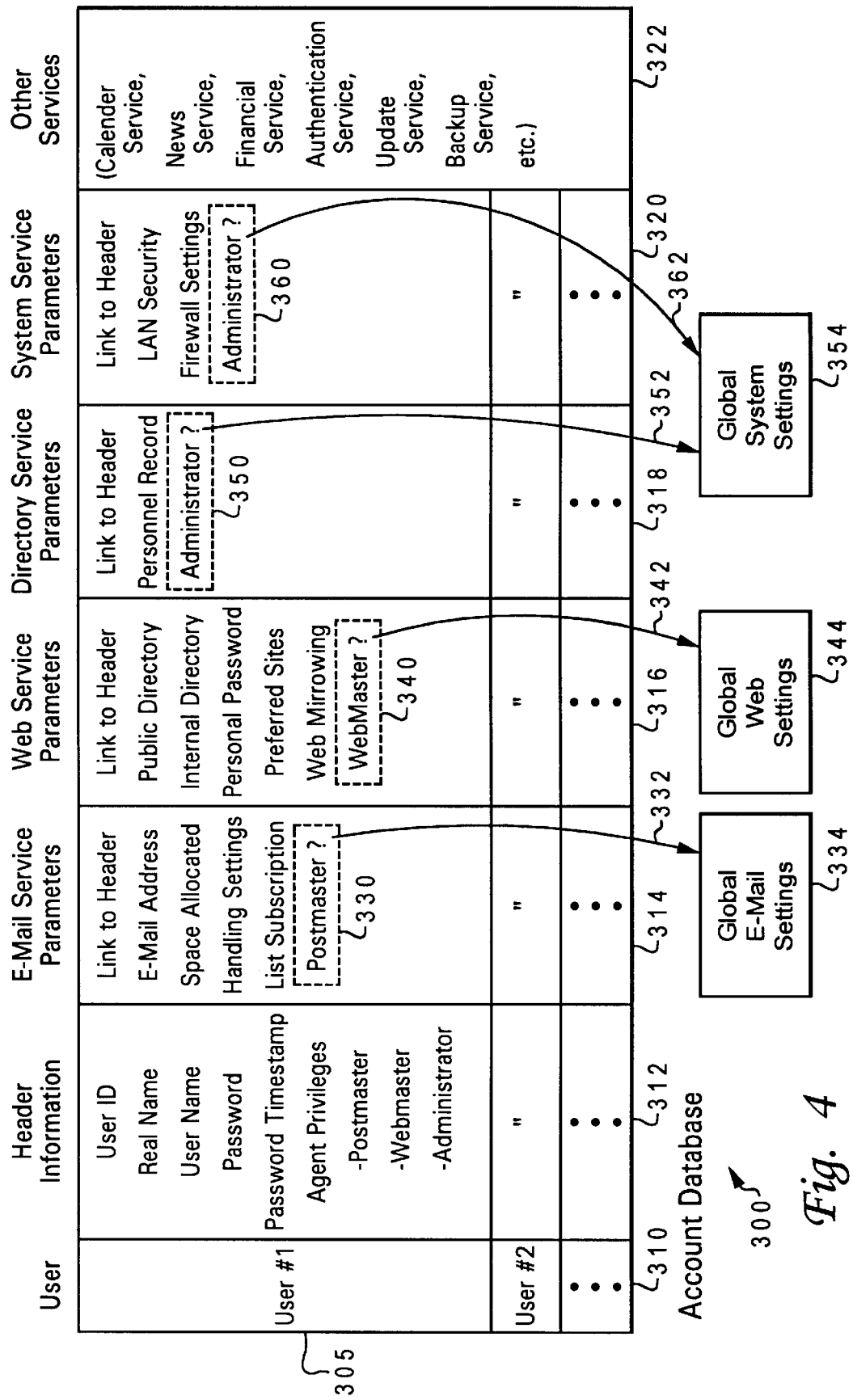
FIG. 4 illustrates a central account database table used in an embodiment of the present invention.

FIG. 4 illustrates an embodiment of an account database table 300 for use with the present invention. A use of account database 300 with the present invention will be discussed in more detail below with reference to FIGS. 12D, 13B and 14B. An account database may be implemented in a wide variety of manners. By way of example, an account database may be implemented as shown in FIG. 4 in which the information is stored in one table in a central location. Alternatively, the conceptual format of the table may be used, while the information may be stored in different locations. An account database 300 provides in a central location all of the parameters and settings for particular services within a computer system for each user of that system. Such a database is advantageous because it allows this information to be stored in one location and not duplicated. Duplication of information often leads to errors and requires extra effort. Also, such a database provides for more efficient administration of such a system, and allows the various services a central, easy to access location for parameters and values of other services as required. Also, the addition, modification and deletion of user accounts is made more efficient through the use of such a table.

In the embodiment shown, the account database 300 is represented as including rows of user information 305 corresponding to a particular user of the system, and columns of service parameters for a particular service. As will be appreciated by those skilled in the art, the table based representation is intended as a conceptual representation of the information stored in the database, but is not intended to necessarily literally represent the structure of the data stored in memory. With this in mind, account database 300 has a column 310 indicating a particular user, and a column 312 containing header information that is basic information unique to a particular user. In one embodiment, each column of service parameters includes a link back to the header information in order to easily access this information for each service.

In the embodiment illustrated, header information 312 includes parameters such as a User Id which is a unique identifier in time and space, a Real Name which is the actual name of the user, a User Name which is some convenient "handle" or nickname for uniquely identifying the user on the computer system, a Password for the user, a Password Timestamp indicating when the password must be changed, and various Agent Privileges. Agent Privileges indicate the status of a particular user with regard to a particular service. For example, Agent Privileges indicate whether or not a user is enabled for a particular service such as e-mail or the web. Agent Privileges also indicate whether a user is a postmaster for an e-mail service, a webmaster for a web service, an administrator for a directory or system service, or may indicate another preferred status for any other service available on the computer system.

Column 314 contains a list of e-mail service parameters and values used to set up and configure e-mail service for a particular user. For example, such parameters may include an e-mail address for each user, space allocated for each user to store e-mail, handling settings such as log enablement, start-up options, mail sorting, password, mail notification, individual message handling, and settings for other features that may be provided by an email service. Also included are subscriptions lists that a user may wish to subscribe to in order to receive automatic e-mail from either inside the company or from the Internet. If a user has a postmaster flag 330, then that user is also provided with a link 332 to a table 334 of global e-mail settings that allow that user to globally adjust the e-mail service. These global e-mail settings 334 are stored in a single location and may be viewed or modified by any user who has the postmaster privilege.

Column 316 contains parameters and values associated with a web service. By way of example, column 316 may include such parameters as a public directory indicating a directory for publishing of external web sites, an internal directory for publishing web sites for company use, a personal password used for selectively allowing access to a web site, preferred sites which indicate a user's favorite web site, and web mirroring parameters which allow a web site to automatically be mirrored up to an Internet service provider. If a user has a webmaster flag 340, then that user is also provided with a link 342 to a table 344 of global web settings that allow that user to globally adjust the web service. These global web settings 344 are stored in a single location and may be viewed or modified by any user who has the webmaster privilege.

Column 318 contains parameters and values corresponding to a directory service. A directory service may be implemented in a wide variety of manners. By way of example, a directory service may be implemented using the X-500 standard. This column contains the full personnel record of a user including header information and any other suitable information for a user. If a user has an administrator flag 350, then that user is also provided with a link 352 to a table 354 of global system settings that allow that user to globally adjust the system. These global system settings 354 are stored in a single location and may be viewed or modified by any user who is an administrator.

Column 320 contains parameters and values related to a system service. In the embodiment shown, this includes parameters related to local area network (LAN) security that set up a user's access to a LAN, and firewall settings that set up a user's access either within a LAN or to the outside world via the Internet. Other parameters are possible as well. An Administrator flag 360 may also be included in this list of parameters with a link 362 to global system settings 354.

Of course, a wide variety of other services 322 may be available on a computer system and accordingly may utilize the account database to store parameters and values that are required or useful to automatically configure the service for new users. By way of example, other such services may include a calendar service to assist a user in managing time, a news service for allowing a user to automatically receive selected news, a financial service for assisting the user in banking and other financial services, an authentication service used to uniquely authenticate an individual or company, an update service used to automatically update software on the computer system, a backup service used to automatically backup selected files from the computer system to another location, etc.

Figure 5:
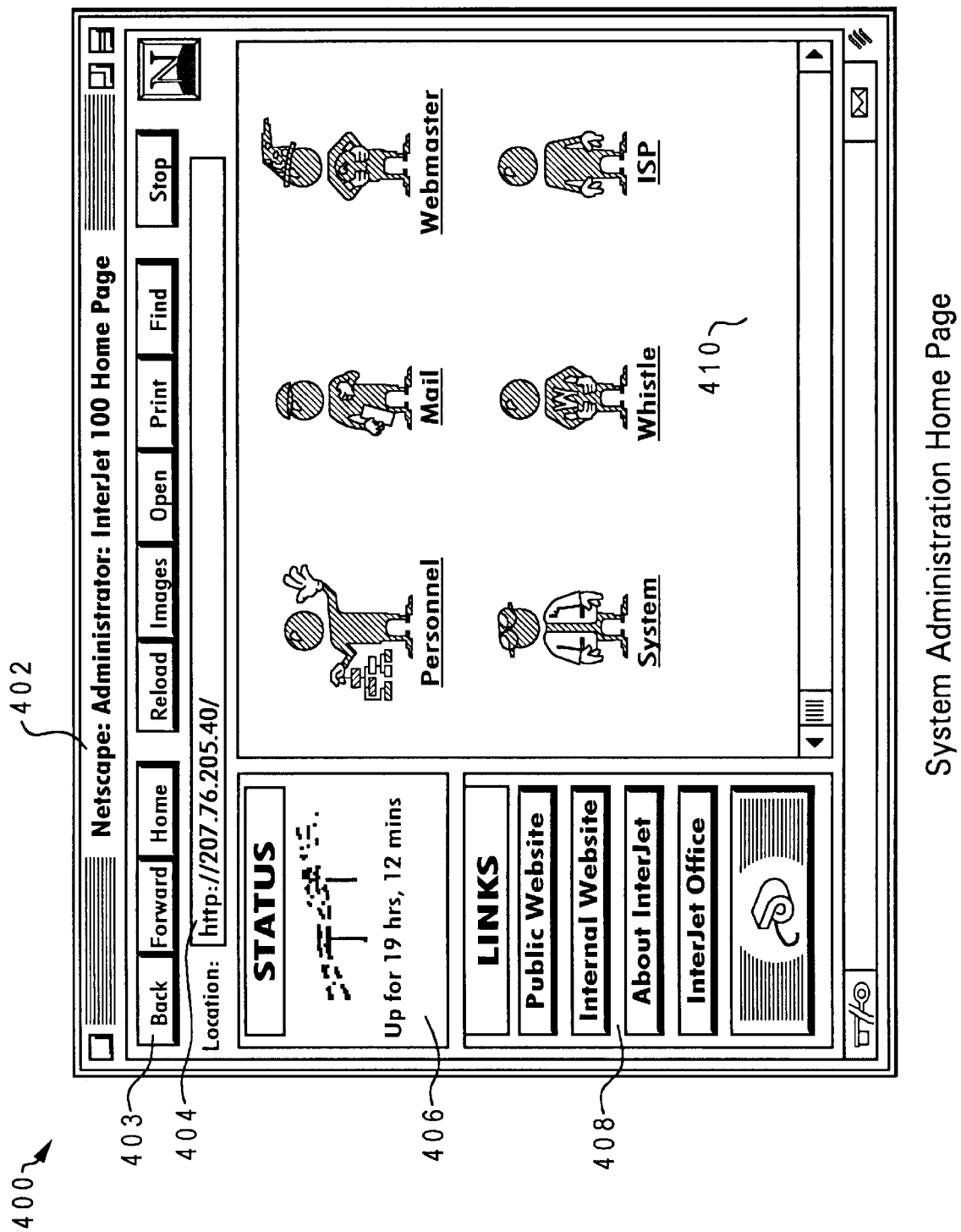
FIG. 5 is a screen shot depicting an embodiment of a user interface for the present invention.
Figure 7:
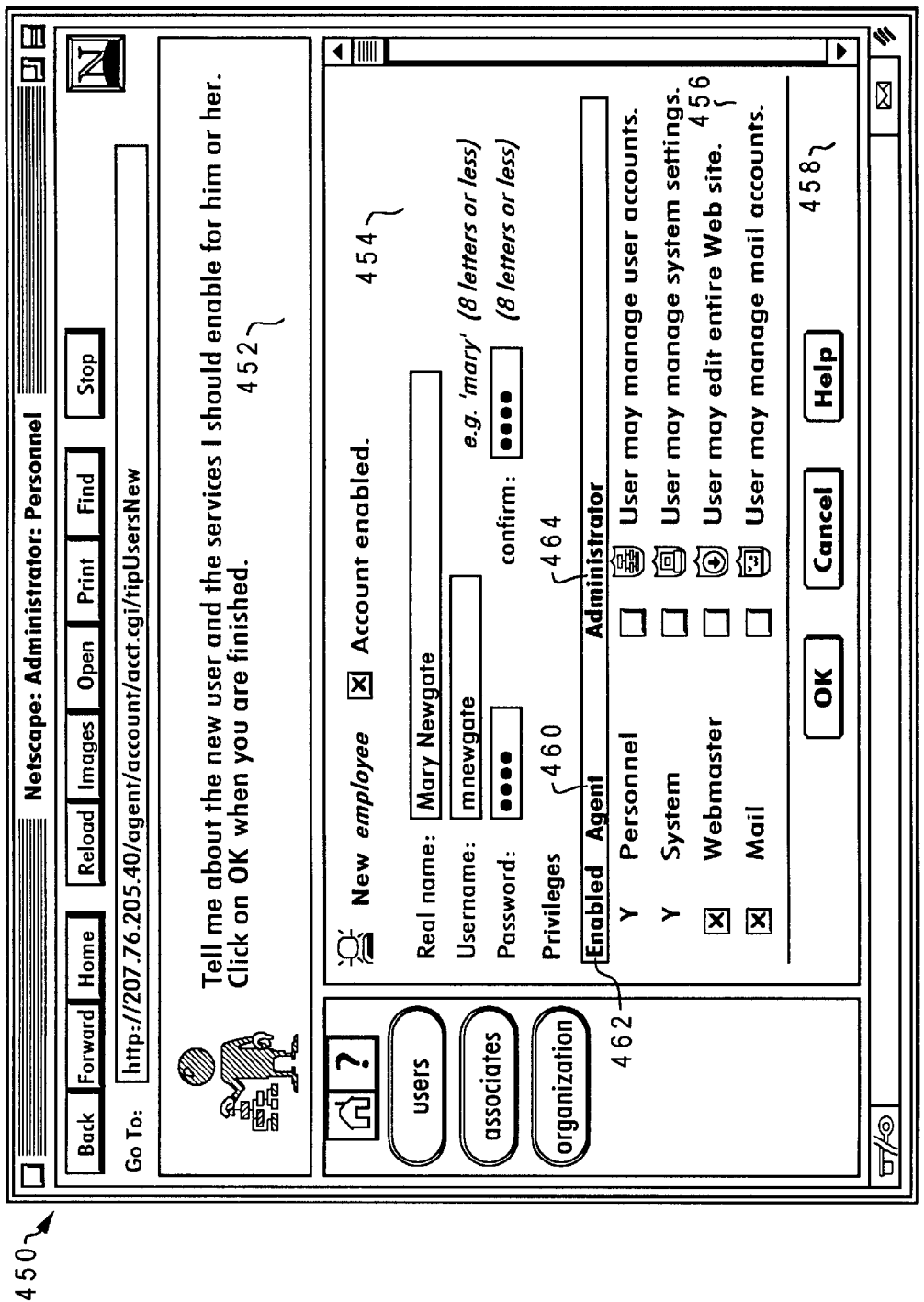
FIG. 7 is a screen shot depicting an embodiment of a user interface for adding a new user.
Figure 8:
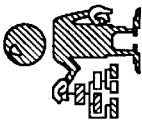
FIG. 8 is a screen shot depicting an embodiment of a user interface for editing a user account.
Figure 9:
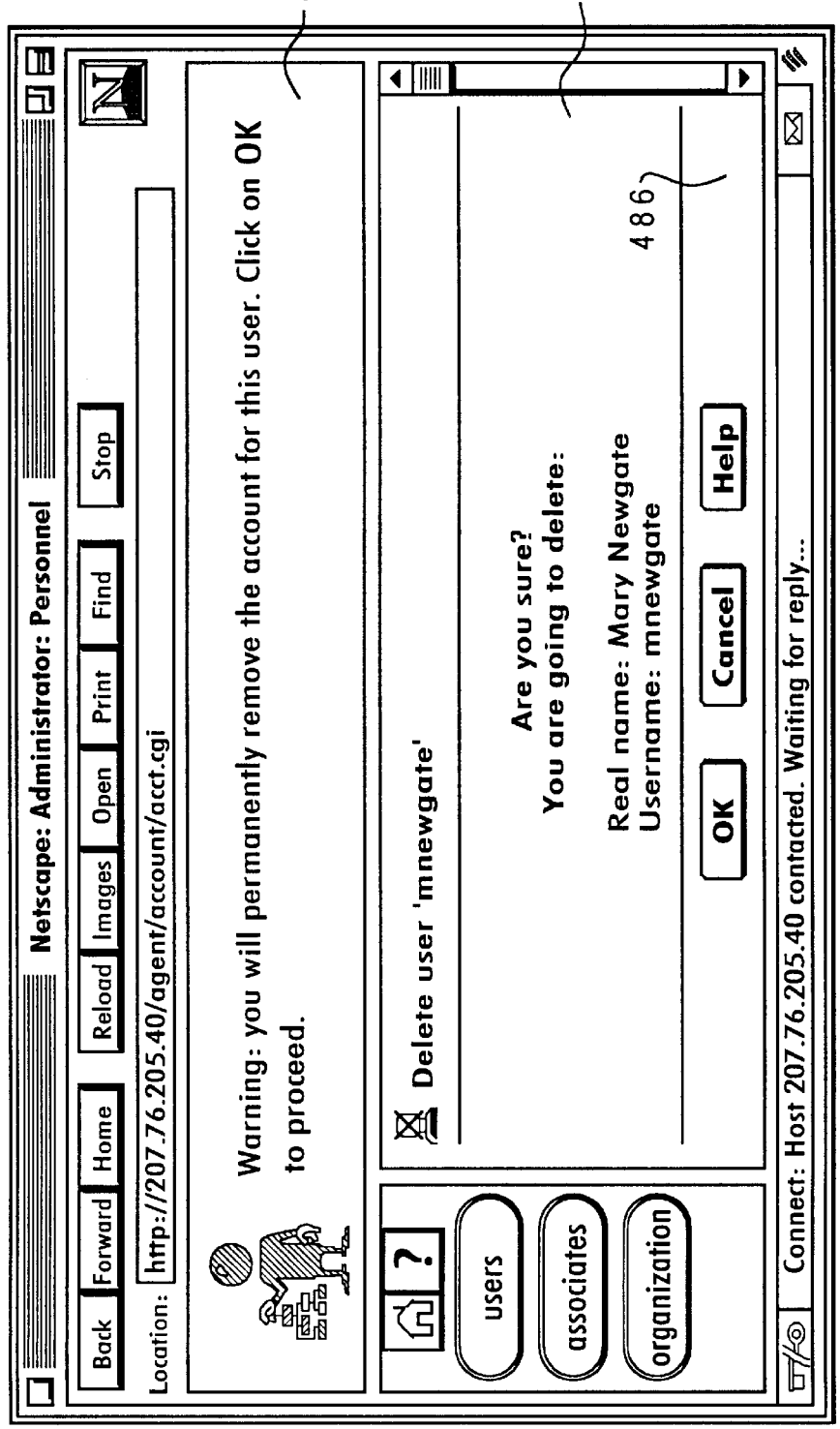
FIG. 9 is a screen shot depicting an embodiment of a user interface for deleting a user account.

The present invention may be implemented using a wide variety of user interfaces. By way of example, one such set of user interfaces for using the present invention is shown in FIGS. 5 through 9. These figures will now be introduced, and their use will be discussed in greater detail in the explanation of the flow charts of FIGS. 11 through 14. FIG. 5 shows a system administration home page user interface 400 for use by a system administrator. FIG. 6 shows a directory service user interface 420 for use by an administrator in adding, editing or deleting users of the system. FIG. 7 shows a user interface 450 for adding a new user account. FIG. 8 shows a user interface 470 for editing a user account. FIG. 9 shows a user interface 480 for deleting a user account.

The user interfaces of FIGS. 5 through 9 may be implemented using a wide variety of software tools. By way of example, the user interface may be implemented using a browser, such as the NAVIGATOR browser available from Netscape Communications Corporation of Mountain View, Calif. The home page user interface 400 of FIG. 5 includes a browser 402 with standard browser buttons 403 and an input window 404, a status window 406 for indicating the status of the computer system and its connection to the Internet, links 408 to other web sites, and an interactive window 410. Window 410 includes various icons used for accessing agents that assist the administrator in managing the available services. A wide variety of services may be represented in window 410 by their respective agent icons. By way of example, included in window 410 are icons representing a personnel agent for managing a directory service, a mail agent for managing an e-mail service, a webmaster agent for managing a web publishing service, a system agent for managing a system service, a whistle agent representing services and information provided by a vendor such as Whistle Communications Corporation, and an ISP agent for managing communication with an Internet service provider.

An agent (represented by a particular icon on the screen) assists a user in interacting with a particular service available on the computer system. A wide variety of types and forms of agents are possible. By way of example, a personnel agent assists a user in interacting with a directory service, such as by adding new users, changing information regarding a user, and displaying current information relating to the state of affairs of the directory service. A mail agent may assist a user by informing of messages, editing mailing or subscription lists, changing electronic mail parameters, etc. A webmaster agent assists a user in creating a personal web page, adding information to a company internal or external web site, creating a company web site (for a user with the correct permissions), performing web mirroring to an ISP server, and keeping track of information relating to internal and external web sites. A system agent helps the user by providing information about a local area network, assisting in adding devices to a network and assigning an IP address, configuring and/or changing information about a device on the network, keeping track of network users, providing information on file sharing, keeping track of Ethernet status and ports, assisting with TCP/IP configuration, setting the clock on an NTP time server, providing access and assistance with diagnostic tools for use by a network expert, performing backups, updating system software, and keeping track of system logs, etc.

A whistle agent provides assistance with using an internet access device and provides information on using the vast array of resources on the Internet. An ISP agent provides information relating to the ISP that a customer has chosen, provides current configuration and level of service information to the customer, and facilitates communication between the customer and the ISP, etc. In general, the agents (through their respective icons) provide a user with an easy graphical technique for managing all of the features and functionality that an internet access device may provide. The agents are advantageous because they provide not only an easy-to-use graphical interface, but also interface between the user and their respective services.

FIG. 6 shows a user interface 420 for a directory service that is managed by a personnel agent. The user interface has a message window 422 and an interactive window 424. Message window 422 displays the personnel agent's icon and any messages to the system administrator relating to the directory service. Interactive window 424 contains buttons, windows and information allowing a system administrator to manage the users of a computer system. Included are a pull-down menu 426 which allows a template to be chosen in order to create a particular type of new user. A wide variety of templates may be stored in the system and available from the pull-down menu. By way of example, pull-down menu 426 may allow a choice between an employee template and an administrator template. "New" button 428 allows a new user to be added to the system, "edit" button 430 allows the account for a current user to be edited, and "delete" button 432 allows a user to be deleted from the system. The user interface that is presented in response to the selection of each of the "new," "edit," and "delete" buttons will be described in more detail below with respect to FIGS. 7, 8 and 9 respectively. Of course, a wide variety of other buttons and functionalities may be provided as well.

The lower portion of window 424 contains information regarding the users of the system. A wide variety of information on each user may be displayed including all of the information available in the account database 300 of FIG. 4. By way of example, interactive window 424 includes a real name column 434 listing the actual name of each user, a user name column 436, an administration column 438 showing graphically the agent privileges that each user has, and a select column 440 that allows a user to be selected and also displays a small icon indicating whether the entry corresponds to a user or to a template, which may also be edited.

FIG. 7 shows a user interface 450 for adding a new user after the "new" button 428 of FIG. 6 has been pressed. The interface includes a message window 452, user information 454, an agent privileges window 456, and command buttons 458. Message window 452 includes the personnel agent icon and a message relating to the addition of a new user. User information 454 may include a wide variety of user information that may be displayed, added or edited by a system administrator. By way of example, user information includes a user's real name, a user name, and a password. Agent privileges window 456 includes an agent column 460 listing the agents corresponding to particular service available within the system, an enabled column 462 indicating whether that user is enabled for that service, and an administrator column 464 indicating whether a user has a higher privilege for a particular service, such as being a postmaster within the e-mail service. Other status levels within a service may also be provided. Command buttons 458 include a "cancel" command to stop the addition of a new user, a "help" command for assistance, and an "OK" button for submitting a new user form.

FIG. 8 shows a user interface 470 for editing a user account after the "edit" button 430 of FIG. 6 has been pressed. The interface includes a message window 472, user information 474, an agent privileges window 476, and command buttons 478. Message window 472 includes the personnel agent icon and a message relating to the editing of a new user. User information 474 includes a wide variety of user information that may be edited. Agent privileges window 476 includes an agent column 460 listing the agents corresponding to particular service available within the system, an enabled column 462 indicating whether that user is enabled for that service, and an administrator column 464 indicating whether a user has a higher privilege for a particular service, such as being a postmaster within the e-mail service. Other status levels within a service are possible as well. An advanced column 466 gives access to more detailed configuration options of a particular service. Command buttons 478 include a "cancel" command to stop the editing of a user, a "help" command for assistance, and an "OK" button for submitting an edited user form.

FIG. 9 shows a user interface 480 for deleting a user after the "delete" button 432 of FIG. 6 has been pressed. The interface includes a message window 482, a confirmation window 484, and command buttons 486. Message window 482 includes the personnel agent icon and a message relating to the deletion of a user. Confirmation window 484 includes a delete confirmation message along with identification for the particular selected. Command buttons 458 include a "cancel" command to stop the addition of a new user, a "help" command for assistance, and an "OK" button for submitting a new user form.

Figure 10:
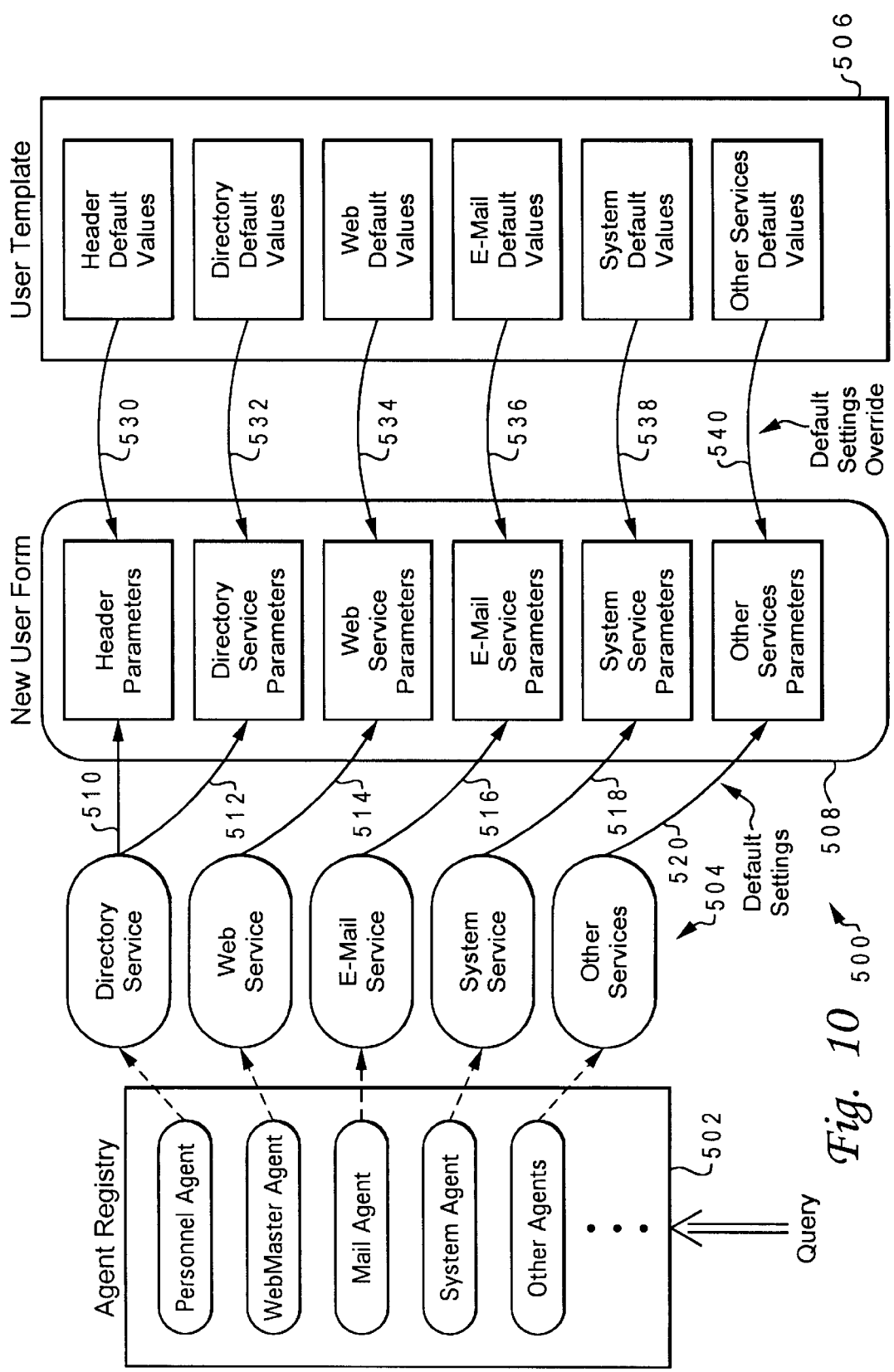
FIG. 10 illustrates the relationship between the agent registry, various services, and a user template in the creation of a new user form for a new user to be added.

Now that an embodiment of a user interface has been described, the creation of a new user form will be shown graphically in FIG. 10, and will be described in detail in conjunction with the flow chart of FIG. 12. FIG. 10 illustrates the relationship 500 between the agent registry 502, the various services 504, and a user template 506 in the creation of a new user form 508. A new user form is generated in the context of adding a new user to a computer system. In general, agent registry 502 contains a list of all available agents, each available agent, in turn, representing an available service on the computer system such as e-mail. Each agent is then available to direct its associated service 504 to copy default settings 510 to 520 for its parameters to the blank parameters of the new user form 508. User template 506 also has default settings 530 to 540 for the various services which are also copied to the appropriate parameters of the new user form and will override any default settings 510 to 520 from the services themselves.

Agent registry 502 contains a list of agents available within the system and may be implemented in a wide variety of manners. For example, if the system contains an e-mail service, then the mail agent will be present in the agent registry. If a web publishing service is available within the system, then the webmaster agent will be listed in the agent registry. In the embodiment illustrated, agent registry 502 contains a personnel agent, a webmaster agent, a mail agent, a system agent, and other agents that represent services available within the system.

In the creation of a new user form, a particular agent will direct one of the services 504 to copy one set of the default settings 5 10 to 520 onto new user form 508. For example, when requested by the system, the web service will be directed to copy appropriate default settings 514 onto a set of web service parameters within a new user form. These web service default settings 514 may be tailored for a particular type of user. For example, default settings for an administrator may be different from those for a regular employee.

User template 506 is a template representing a particular type of user on the system. By way of example, user template 506 may represent an administrator or a regular employee and the corresponding default settings may be different. When requested by the system, default settings 530 to 540 are copied for each service from the user template onto the appropriate parameters of the new user form and will override any default settings previously copied from any services 504. For example, default values 534 for a web service from the user template 506 are copied onto the web service parameters of the new user form 508. In this fashion, a new user form is created that has appropriate default settings for a particular type of user for each service available within the system. Now that the user interface and construction of a new user form have been described, FIGS. 11 through 14 describe in detail the processing of commands such as add user, edit user, and delete user.

Figure 11:
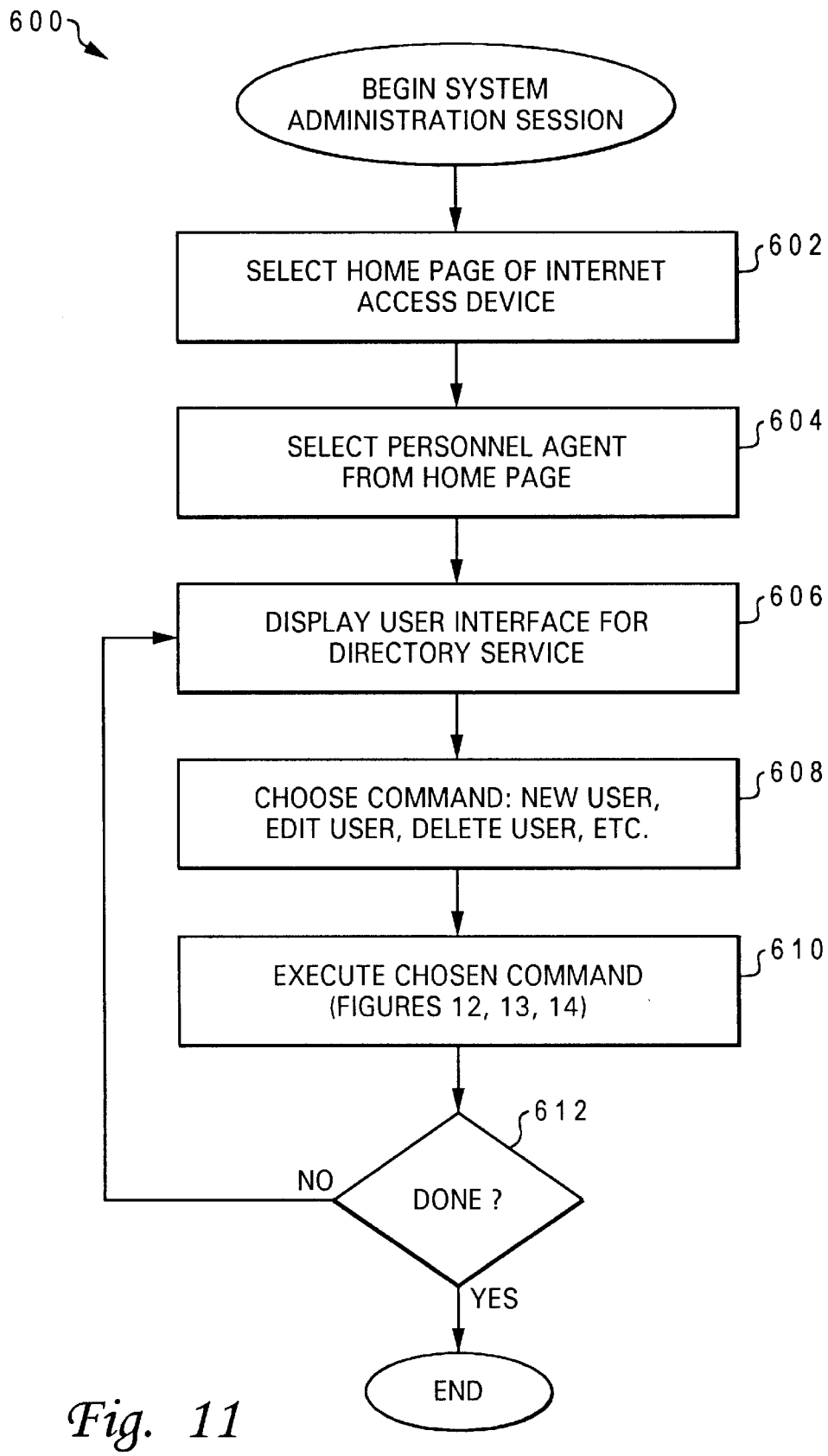
FIG. 11 is a flow chart illustrating a system administration session including the execution of commands.

FIG. 11 is a flow chart 600 illustrating a representative method of performing a system administration session. A wide variety of commands may be issued and executed during any administration session. By way of example, the add user, edit user and delete user commands are described in detail in FIGS. 12, 13 and 14 respectively.

System administration software for use in an embodiment of the present invention may be loaded onto a computer system in any suitable manner. In the described embodiment, system administration software is present on an Internet access device as described above with reference to FIG. 2. The Internet access device is connected to a local area network at a customer site. In one embodiment, the Internet access device is automatically configured for communication with the Internet as described in the above-referenced U.S. Patent Application entitled "Automatic Configuration for Internet Access Device". An installation disk is inserted into an administrator workstation, and the administrator downloads browser software from the Internet access device in order to use the system administration software.

In the embodiment shown in FIG. 11, the administrator initially selects the home page of the Internet access device in step 602. This causes the administrator's computer to display the home page user interface 400 as shown in FIG. 5. In step 604 the personnel agent is selected from the home page in order to access a user interface for the directory service. The selection of the personnel agent causes the user interface for the directory service as shown in FIG. 6 to be displayed on the administrator's workstation in step 606. In step 608, an appropriate command such as new user, edit user, delete user, or other is chosen from the directory service user interface. In step 610 this chosen command is executed. Execution of a particular command will be discussed in more detail below with reference to FIGS. 12, 13 and 14. Next, in step 612 if the session is done then the procedure ends, if not, then the user interface for the directory service as shown in FIG. 6 is displayed and further commands may be issued.

FIGS. 12A through 12D explain in greater detail the add new user step 610 of FIG. 11. In a first step 702, a particular user template is selected. As shown in FIG. 6, pull-down menu 426 may be used to select an employee user template, an administrator user template or other. A user template for a particular user contains appropriate default values for header parameters and for parameters pertaining to services available within the system as shown in user template 506 of FIG. 10. For example, a user template for an employee contains default header information applicable to a regular employee and default values for various services that are appropriate for an employee of a corporation. It should be appreciated that a multitude of user templates and a variety of default values may be chosen via this technique. Once a template is selected, then the "new" button 428 is pressed to begin processing.

Next in step 704, a new user form is generated and displayed based upon the selected user template. This step will be explained in greater detail below with reference to FIGS. 10 and 12B, and results in a user form being displayed such as the new employee user form shown in FIG. 7. In step 706, the user data 454 of the new user form may be entered as desired. For example, the real name of a user may be typed in, and a password may be chosen and confirmed for that user. Next in step 708, the default settings for available services may be edited. For example, the agent privileges window 456 of FIG. 7 may be edited to add or delete privileges for this user. For example, entries in the enabled column 462 may be toggled to either enable or disable a service for that user. In addition, a user may be made a webmaster for e-mail service by toggling the appropriate button in the administrator column 464. Other settings for any of these services may also be adjusted for the new employee user.

Once data has been entered or edited, the administrator may select a "help" button in step 710, may select an "OK" button in step 716 or may select a "cancel" button in step 714. Theses command buttons 458 are shown in FIG. 7. If the "help" button is selected then in step 712 the "help" request is processed and the administrator may continue entering or editing data in steps 706 and 708. If the "cancel" button is selected, then this step 610 is done and control returns to step 612 of FIG. 11.

If the "OK" button is selected, then in step 718 this new user form is submitted to the system for processing. In step 720 a validity check of the new user form is performed as will be described in greater detail with reference to FIG. 12C below. If the user form is not valid, then in step 724 an error message is displayed and the administrator is allowed to re-enter or edit information. If, however, the form is valid, then in step 726 a new user account is created and the user is automatically subscribed to the selected services as will be explained in greater detail below with reference to FIG. 12D. After this step, then step 610 is done and control returns to step 612 of Figure II.

Figure 12A:
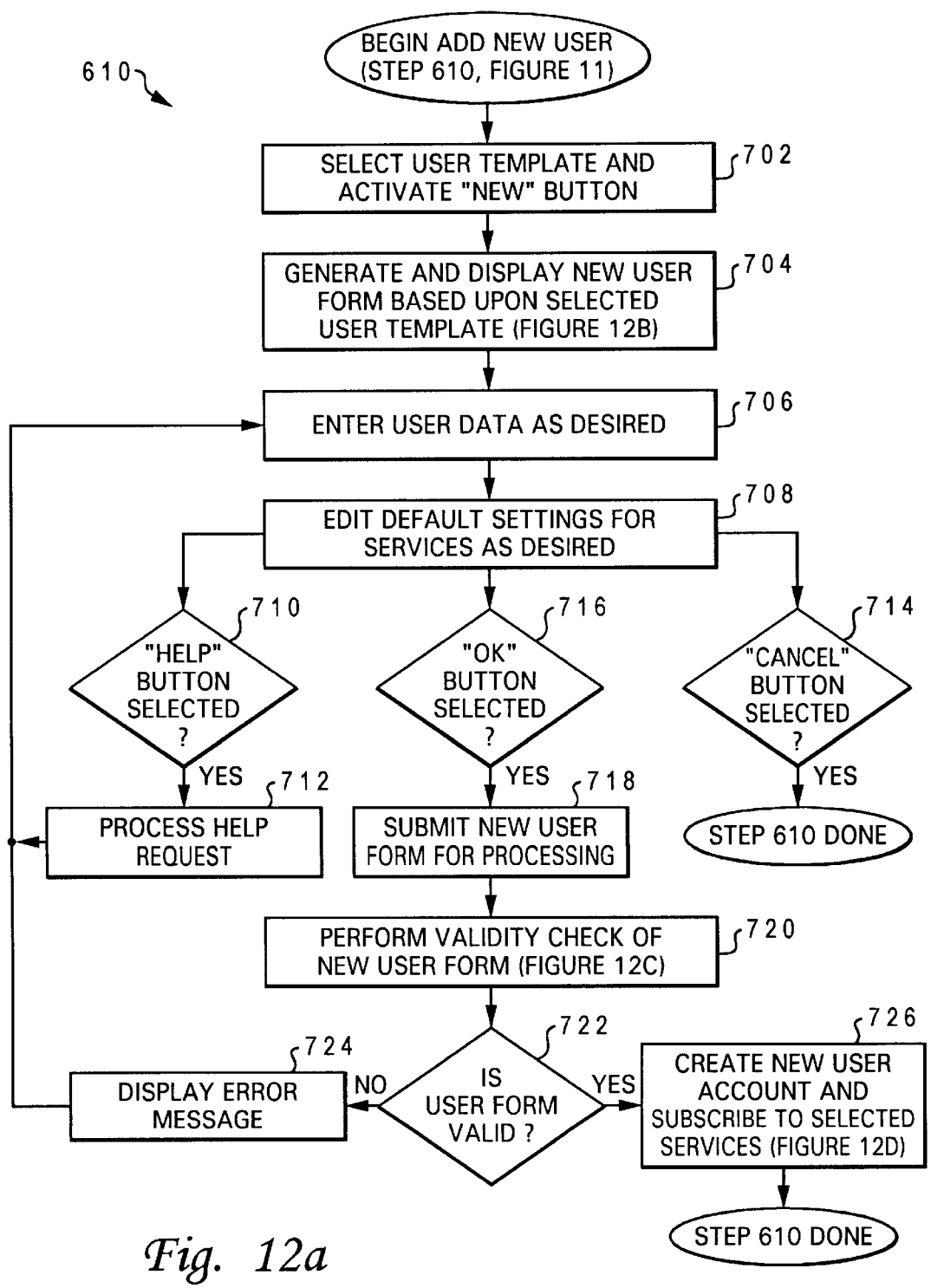
FIG. 12A is a flow chart illustrating a method for the add new user command from FIG. 11.
Figure 12B:
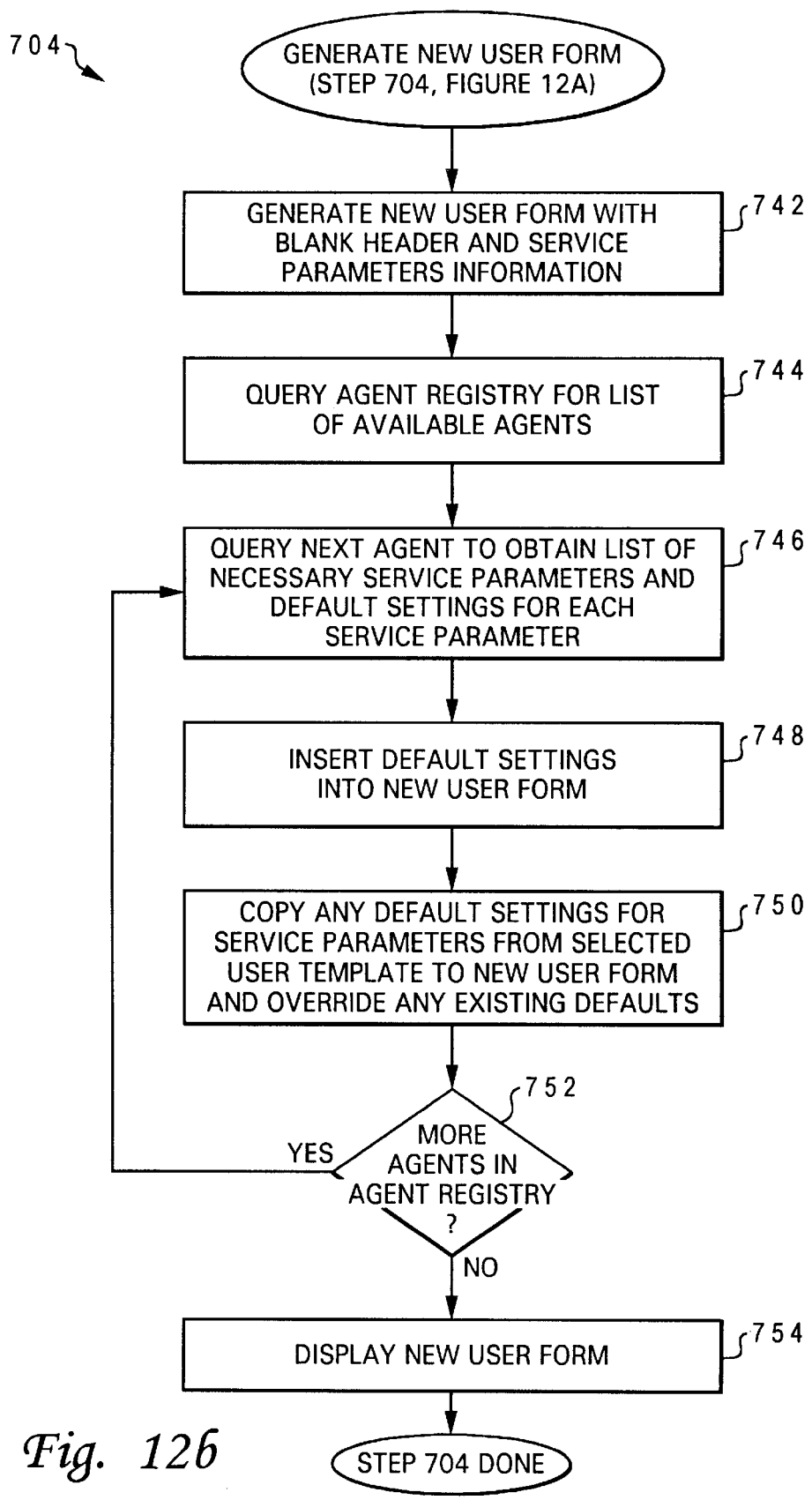
FIG. 12B is a flow chart illustrating a method for the generate new user form step 704 from FIG. 12A.

FIG. 12B describes the generate new user form step 704 of FIG. 12A. In a first step 742, a new user form is generated having blank header information and also empty parameter values for various services available within the system. A new user form 508 with place holders for parameters is shown in FIG. 10. Next, in step 744, the agent registry 502 of FIG. 10 is queried in order to return a list of all available agents within the system. These agents manage corresponding services available, and a listing of an agent in the agent registry indicates that a service is available within the system. For example, if a mail agent is present in the agent registry, this indicates that an e-mail service is available within the system for users.

In step 746 a first (or the next) agent in the agent registry is queried to obtain a list of all the necessary service parameters for the service that it represents, and also for any default settings for each parameter. For example, an e-mail service may have a parameter "space allocated" that has a default setting of 100K of space for each user. Next, in step 748, as shown in FIG. 10, these default settings 510 to 520 for each available service are inserted into the new user form 508. Next in step 750, any default settings 530 to 540 for service parameters from the selected user template 506 are copied from that template onto the new user form. Because the default settings in the user template are tailored for a particular user, they will override any existing default settings that had previously been copied onto the new user form in step 748. In step 752 if more agents exist in the agent registry then control returns to step 746 and each agent is processed in turn. If, however, no agents remain, then in step 754 the new user form is displayed and step 704 is done.

Figure 12C:
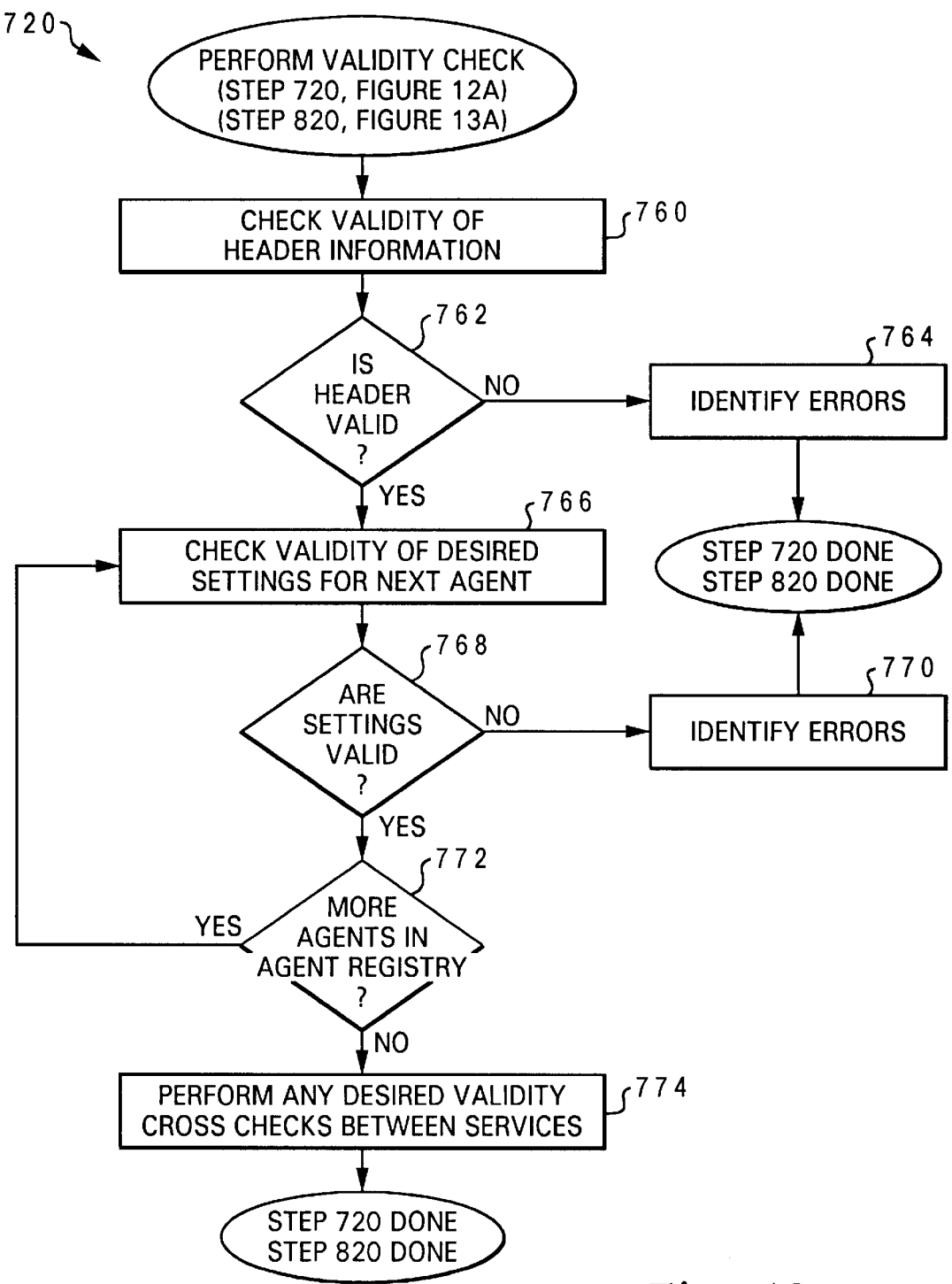
FIG. 12C is a flow chart illustrating a method for the perform validity check step 720 of FIG. 12A, and step 820 of FIG. 13A.
Figure 13A:
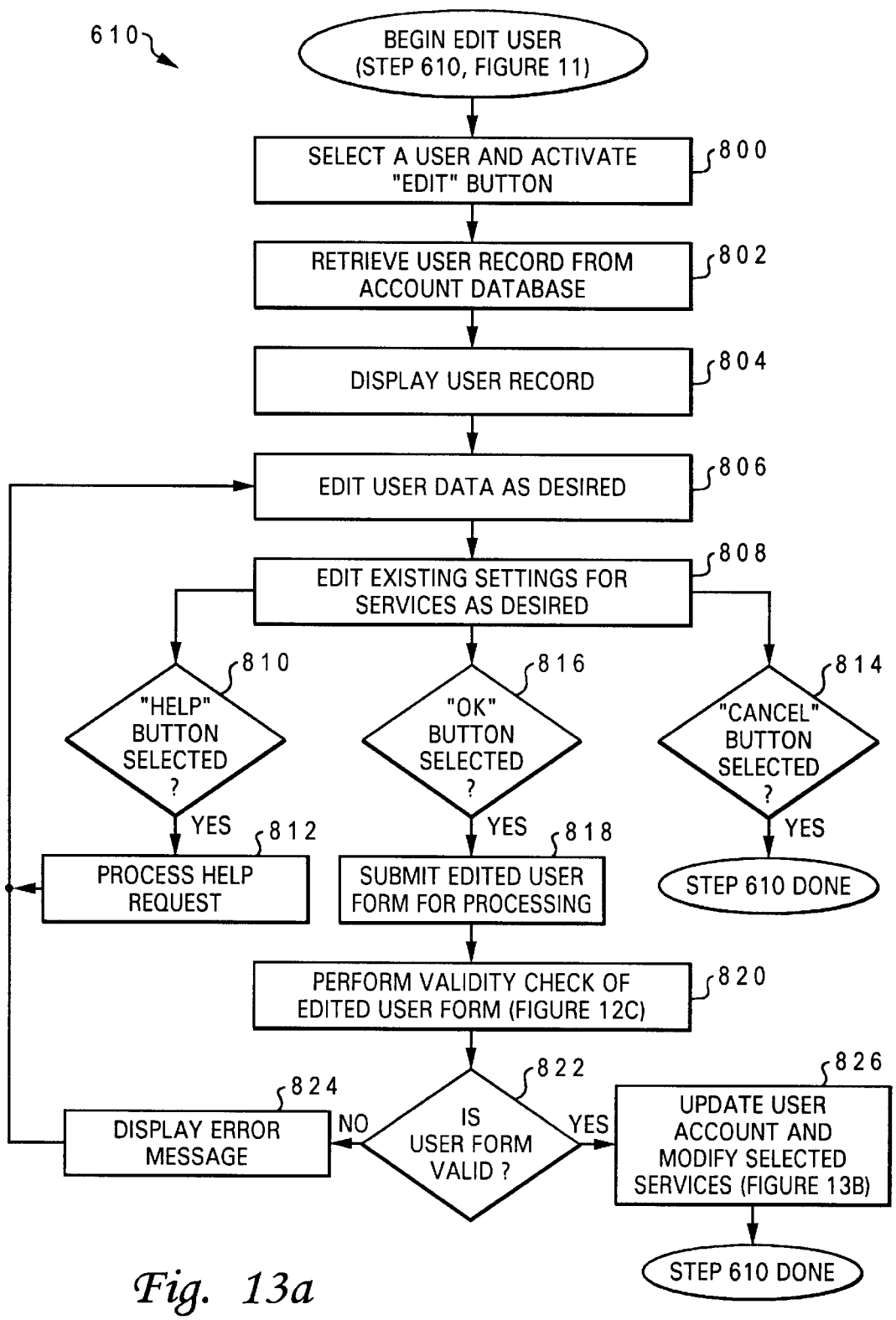
FIGS. 13A and 13B are flow charts illustrating a method for the edit user command of FIG. 11.
Figure 13G:
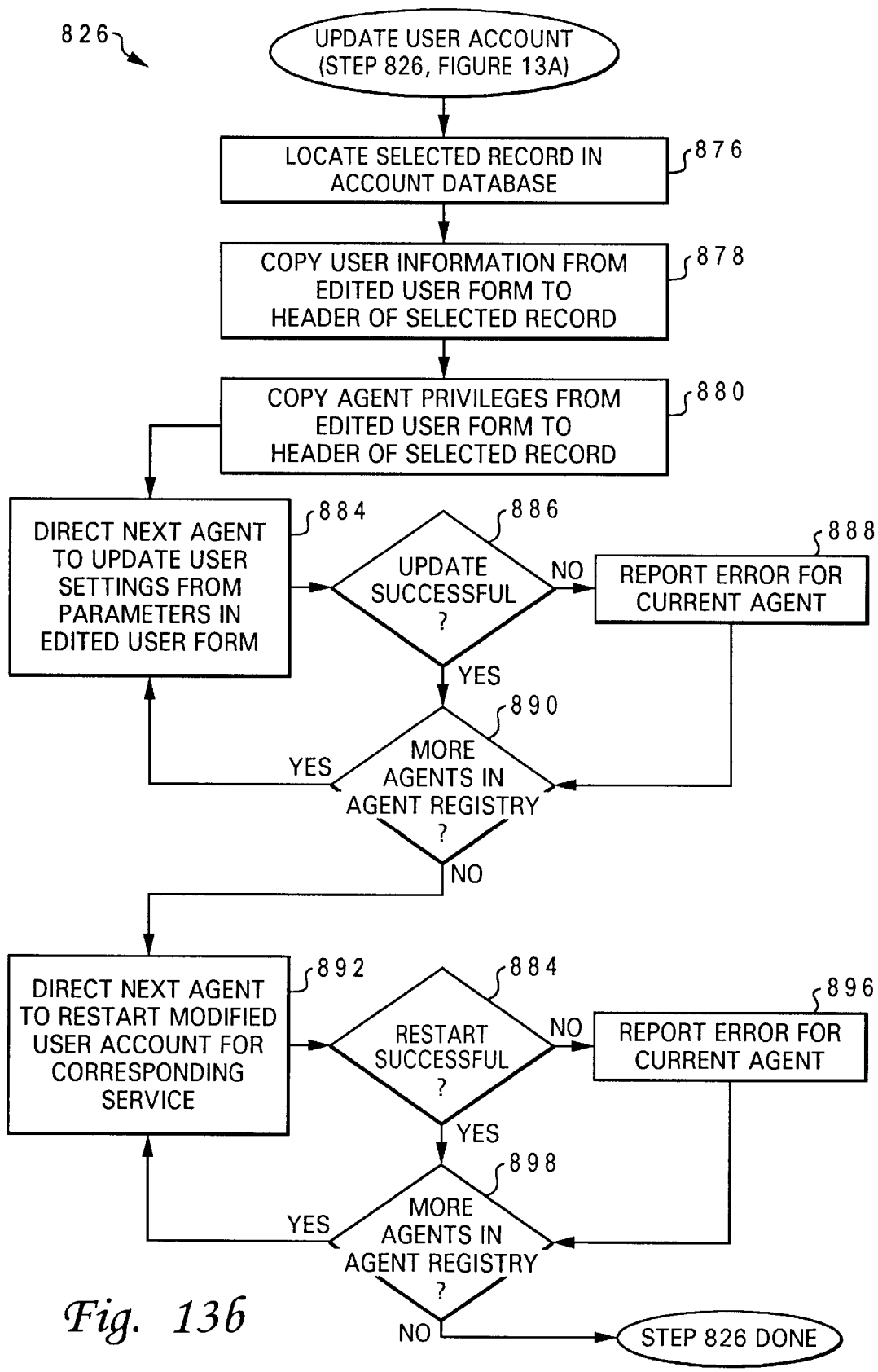

FIG. 12C explains in greater detail the perform validity check step 720 of FIG. 12A and step 820 of FIG. 13A. A validity check is performed of a submitted new user form to ensure that information added or edited by an administrator is consistent within that form, consistent within the system and also between services. In step 760 the header information is checked for validity. For example, a user name may only contain numbers and letters, a password must be at least four characters, a user ID must be unique, etc. If the header is not valid then any errors are identified and displayed in step 764 and then step 720 or 820 is done.

If, however, the header is valid, then in step 766 the settings for each agent (or service) are checked for validity. For example, a user with a privilege of webmaster must also be enabled for that service. If any settings are invalid then in step 770 these errors are identified and step 720 or 820 is done. If the settings for that agent are valid, then step 772 checks whether more agents are in the agent registry. If so, then control returns to step 766 in order to check the validity of the settings for the next agent. If no agents remain, then in step 774 any desired cross-checking between services is performed. For example, a user who is a webmaster must also have access to all appropriate directories within the system. After this step, step 720 or step 820 is done.

Figure 12D:
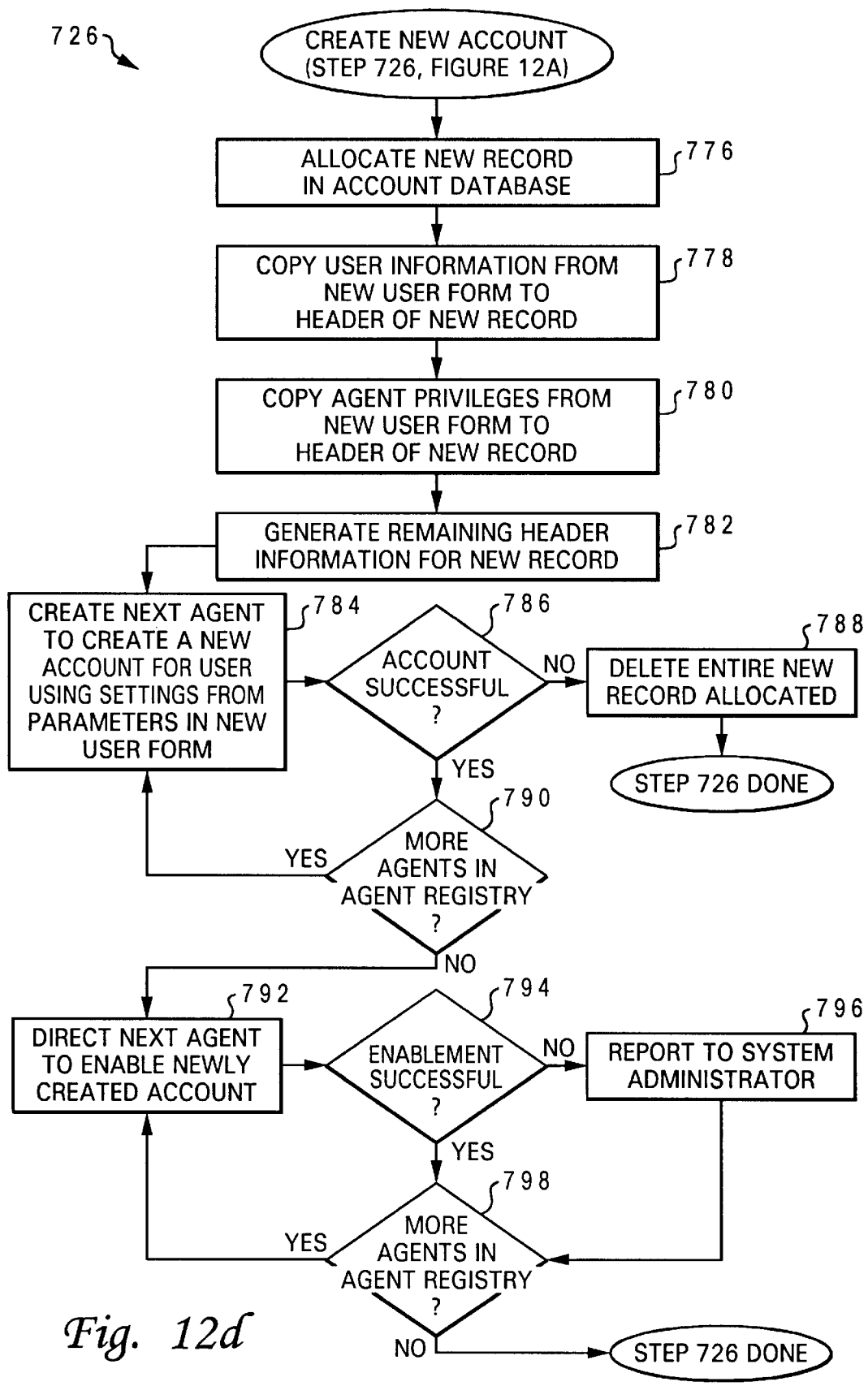
FIG. 12D is a flow chart illustrating a method for the create new account step 726 of FIG. 12A.

FIG. 12D explains in greater detail the create new account step 726 of FIG. 12A. In step 776 a new record in the account database 300 of FIG. 4 is allocated. Conceptually, this may be seen as creating a new row for the new user in the database. In step 778 the user information from the new user form is copied to the header information column 312 of the newly allocated record. In step 780 the agent privileges 456 from the new user form are also copied to the header information of the new record. In step 782 any remaining header information for the new record is generated. For example, a unique user ID may be generated.

In step 784 a first (or the next) appropriate agent is directed to create a new account for its corresponding service for that user using the default settings found for that service in the new user form. For example, if the new user form contains default e-mail service settings, then the mail agent uses these settings to set up a new e-mail account that user. Also, a web service may automatically create a standard web page (or site) for a particular user using default settings such as the user's name, company, telephone, etc. Information may come from the header information or the web service parameters. A link parameter may contain a link to this newly created web page. At this point, the service parameters and default settings for that particular service are copied from the new user form into the appropriate column of the data base 300. For example, any web service parameters and values within new user form 508 of FIG. 10 will be copied to column 316 of the account database of FIG. 4.

If an account for that service was not successfully created, then in step 788 the entire newly allocated record in the account data base 300 is deleted for that user. At this point, step 726 is done. However, if the account was successful, then step 790 checks whether more agents are in the agent registry. If so, then control moves back up to step 784 and each agent is processed in turn. If no agents remain, then control moves on to step 792.

In step 792 a first (or next) agent is directed to enable the newly created account for its corresponding service. This enablement essentially "turns on" the service for that particular user. For example, if the mail agent enables the e-mail service for a new user, then when that new user logs into the system the user will be able to send and receive mail using the default settings that have been specified. If enablement is not successful, then in step 796 a report is sent to the system administrator and control moves to step 798. If enablement is successful, then step 798 checks whether more agents are in the registry, if so control returns to step 792. If no agents remain, then step 726 is done.

FIGS. 13A and 13B explain in greater detail the edit user step 610 of FIG. 11. In a first step 800, a particular user is selected. As shown in FIG. 6, the select column 440 may be used to select a particular. Once a user is selected, then the "edit" button 430 is pressed to begin processing. In step 802 the appropriate user record is retrieved from the account database.

Next in step 804, a subset of the user record is displayed as a user form and appears as shown in FIG. 8. In step 806, the user data 474 of the user form may be edited as desired. For example, the real name of a user may be corrected, a password may be changed, etc. Next in step 808, the default settings for available services may be edited. For example, the agent privileges window 476 of FIG. 8 may be edited to add or delete privileges for this user. For example, entries in the enabled column 462 may be toggled to either enable or disable a service for that user. In addition, a user may be made a webmaster for e-mail service by toggling the appropriate button in the administrator column 464. Other settings for any of these services may also be adjusted for the user.

Once data has been edited, the administrator may select a "help" button in step 810, may select an "OK" button in step 816 or may select a "cancel" button in step 814. Theses command buttons 478 are shown in FIG. 8. If the "help" button is selected then in step 812 the "help" request is processed and the administrator may continue editing data or settings in steps 806 and 808. If the "cancel" button is selected, then this step 610 is done and control returns to step 612 of FIG. 11.

If the "OK" button is selected, then in step 818 this edited user form is submitted to the system for processing. In step 820 a validity check of the edited user form is performed as described in greater detail with reference to FIG. 12C above. If the user form is not valid, then in step 824 an error message is displayed and the administrator is allowed to edit information. If, however, the form is valid, then in step 826 the user account is updated and the user account is automatically modified for the selected services as will be explained in greater detail below with reference to FIG. 13B. After this step, then step 610 is done and control returns to step 612 of FIG. 11.

FIG. 13B explains in greater detail the update user account step 826 of FIG. 13A. In step 876 the record for the selected user is located in the account database 300 of FIG. 4. In step 878 the user information from the edited user form is copied to the header information column 312 of the located record. In step 880 the agent privileges 476 from the edited user form are also copied to the header information of the located record.

In step 884 a first (or the next) appropriate agent is directed to update user settings for its corresponding service for that user using the edited settings found for that service in the edited user form. For example, if a user was disabled for e-mail, then the e-mail service would be directed to disable service for that user. Also, these edited user settings are transferred to the account database for that particular service. If the update for that service was not successful, then in step 888 an error is reported and control moves to step 890. However, if the update was successful, then step 890 checks whether more agents are in the agent registry. If so, then control moves back up to step 884 and each agent is processed in turn. If no agents remain, then control moves on to step 892. In step 892 a first (or next) agent is directed to restart the newly updated account for its corresponding service. If restarting is not successful, then in step 896 a report is generated and control moves to step 898. If enablement is successful, step 898 checks whether more agents are in the registry, if so control returns to step 892. If no agents remain, then step 826 is done.

Figure 14A:
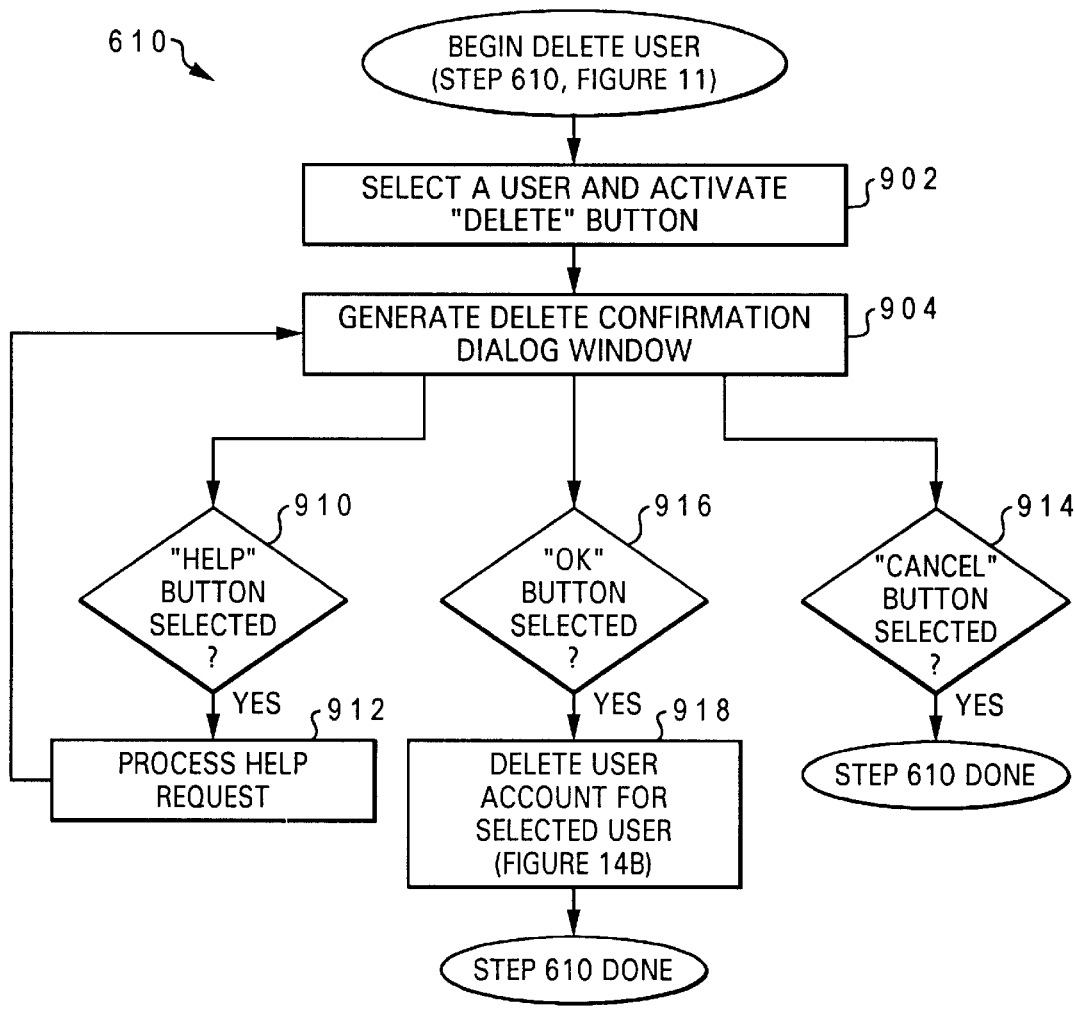
FIGS. 14A and 14B are flow charts illustrating a method for the delete user command of FIG. 11.
Figure 14B:
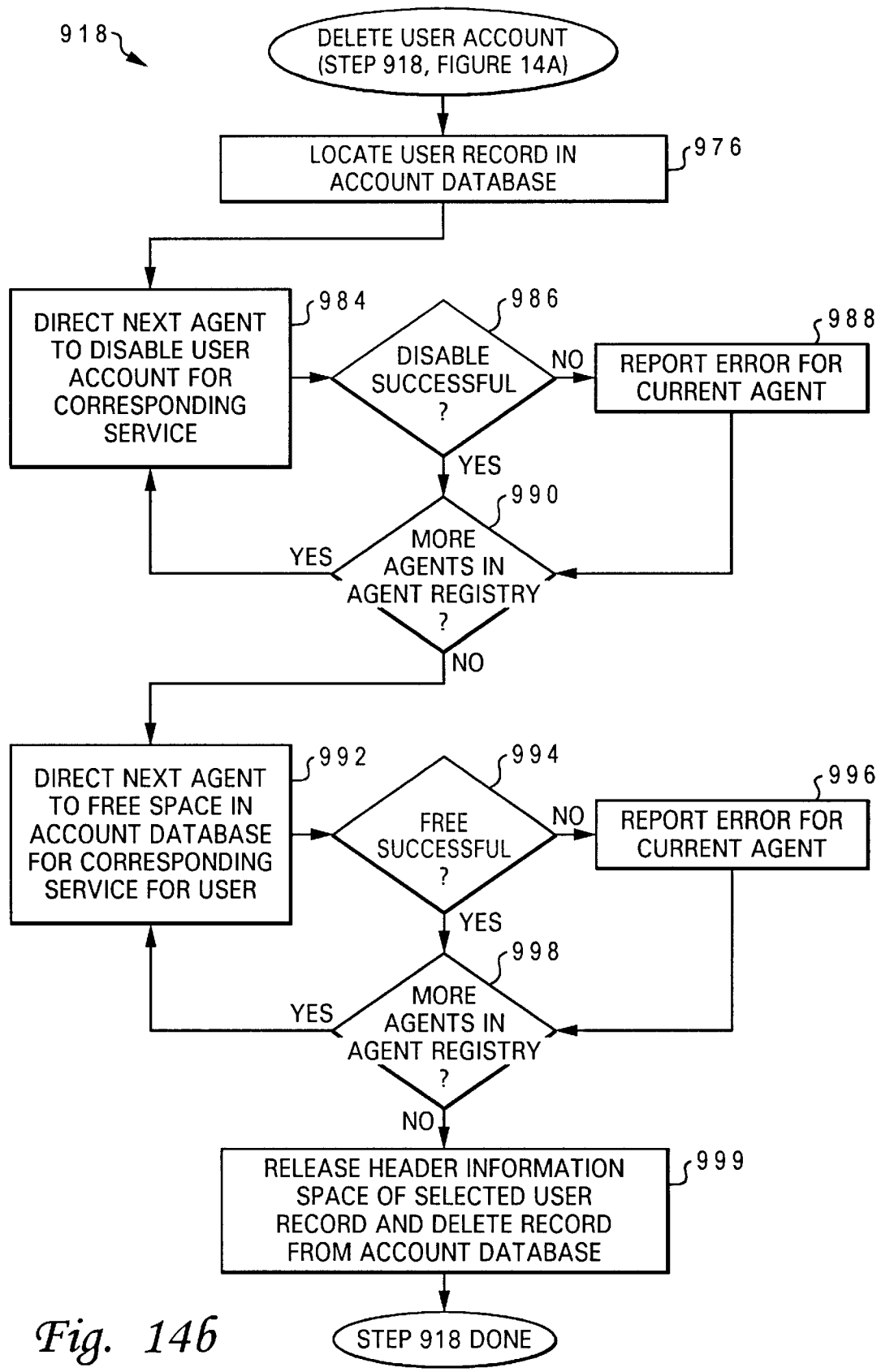

FIGS. 14A and 14B explain in greater detail the delete user step 610 of FIG. 11. In a first step 902, a particular user is selected. As shown in FIG. 6, the select column 440 may be used to select a particular. Once a user is selected, then the "delete" button 432 is pressed to begin processing.

Next in step 904, a confirmation dialog window is shown as in FIG. 9. The administrator may then select a "help" button in step 910, may select an "OK" button in step 916 or may select a "cancel" button in step 914. Theses command buttons 486 are shown in FIG. 9. If the "help" button is selected then in step 912 the "help" request is processed and the dialog window is shown again. If the "cancel" button is selected, then this step 610 is done and control returns to step 612 of FIG. 11. If the "OK" button is selected, then in step 918 the account for the selected user is deleted from the account database as will be explained in greater detail below with reference to FIG. 14B. After this step, then step 610 is done and control returns to step 612 of FIG. 11.

FIG. 14B explains in greater detail the delete user account step 918 of FIG. 14A. In step 976 the record for the selected user is located in the account database 300 of FIG. 4. In step 994 a first (or the next) appropriate agent is directed to disable the user account for its corresponding service. For example, the e-mail service would be directed to disable service for that user.

If the disable for that service was not successful, then in step 988 an error is reported and control moves to step 990. However, if the disable was successful, then step 990 checks whether more agents are in the agent registry. If so, then control moves back up to step 984 and each agent is processed in turn. If no agents remain, then control moves on to step 992. In step 992 a first (or next) agent is directed to free the space in the account database corresponding to its service for the selected user. If the free is not successful, then in step 996 a report is generated and control moves to step 998. If the free is successful, then step 998 checks whether more agents are in the registry, if so control returns to step 992. If no agents remain, then in step 999 the header information for the selected user is released and the entire record for that user is deleted from the account database. After this step, step 918 is done.

Embodiments of the present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, etc. In any of the operations described herein that form part of the present invention these operations are machine operations. Useful machines for performing the operations of embodiments of the present invention include general purpose digital computers or other similar devices. In all cases, there is a distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a specialized apparatus to perform the required steps. The structure for a variety of these machines will appear from the description above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. Examples of input/output devices usable by the present invention include those described above as well as video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Although the foregoing invention has been described in some detail for purposes of clarity of understanding, it will be apparent that certain changes and modifications may be practiced within the scope of the appended claims. For instance, the present invention is applicable to any computer system and not necessarily one connected to the Internet, nor one implemented on an Internet access device. Also, the account database may take many forms and include a variety of parameters and values. The present invention may also be practiced with any suitable user interface that allows the described and/or other commands to be entered. Also, various other services may be represented in the system and may be automatically enabled for use by a user through the present invention. Therefore, the described embodiments should be taken as illustrative and not restrictive, and the invention should not be limited to the details given herein but should be defined by the following claims and their full scope of equivalents.

We claim:

1. A computer-implemented method of automatically enabling users of a computer system for use of an electronic mail service and a web publishing service available on said computer system, each of said services being associated with a set of service parameters that define a level of service for one of said users of said computer system, said method comprising the steps of:

selecting a user template for a particular user of said computer system, said user template indicative of the type of said particular user and including default values for said sets of service parameters for each of said services available;

generating a new user form for said particular user based upon said selected user template and including said default values from said selected user template;

creating an electronic mail user account for said particular user for said electronic mail service available on said computer system using at least in part said default values from said new user form;

creating a web user account for said particular user for said web publishing service available on said computer system using at least in part said default values from said new user form; and enabling each of said services for said particular user so that said user may communicate with and utilize each of said services on said computer system.

2. A method as recited in claim 1 wherein said computer system includes a directory service user interface for facilitating addition of said particular user to said computer system, and wherein said step of selecting a user template uses said directory service user interface, said method further comprising the step of:

editing said default values of said service parameters for said electronic mail service for said particular user using said directory service user interface, such that said directory service user interface is a common interface used by said selecting and editing steps.

3. A method as recited in claim 2 further comprising the step of:

editing said default values of said service parameters for said web publishing service for said particular user using said directory service user interface, said directory service user interface being used by said electronic mail service for maintaining said electronic mail user account and being also used by said web publishing service for maintaining said web user account, such that said directory service user interface assists in integrating said electronic mail service and said web publishing service within said computer system.

4. A method as recited in claim 1 further comprising the step of allocating and creating an entry in an account database data structure for said particular user, said entry in said account database including values for each of said sets of service parameters.

5. A method as recited in claim 1 wherein said user template includes default user data values, said method further comprising the step of modifying said user data values and said default values for said sets of service parameters of said new user form.

6. A method as recited in claim 1 further comprising the step of performing a validity check of said new user form before said steps of creating an electronic mail account and creating a web user account.

7. A method as recited in claim 1 wherein the step of generating a new user form includes the sub-steps of:

querying an agent for each of said services available on said computer system to obtain default settings for each of said sets of service parameters, transferring said default settings obtained from each queried agent to said new user form, and transferring said default values from said selected user template to said new user form, said default values from said selected user template overriding said default settings obtained from each queried agent where conflicting.

8. A computer-implemented method of automatically enabling users of a computer system for use of a plurality of services available on said computer system, each of said plurality of services being associated with a set of service parameters that define a level of service for one of said users of said computer system, said method comprising the steps of:

selecting a user template for a particular user of said computer system, said user template indicative of the type of said particular user and including default values for said sets of service parameters for each of said services available;

generating a new user form for said particular user based upon said selected user template and including said default values from said selected user template;

creating a user account for said particular user for each of said services available on said computer system using at least in part said default values from said new user form; and enabling each of said services for said particular user so that said user may communicate with and utilize each of said services on said computer system.

9. A method as recited in claim 1 wherein said plurality of services include an electronic mail service and a web publishing service, and said step of creating a user account for said particular user for each of said services includes the sub-steps of:

creating an electronic mail account for said particular user, and creating a web account for said particular user including the automatic creation of a web page for said particular user.

10. A method as recited in claim 1 further comprising the step of allocating and creating an entry in an account database data structure for said particular user, said entry in said account database including values for each of said sets of service parameters.

11. A method as recited in claim 1 wherein said user template includes default user data values, said method further comprising the step of modifying said user data values and said default values for said sets of service parameters of said new user form.

12. A method as recited in claim 1 further comprising the step of performing a validity check of said new user form before said steps of creating a user account and enabling each of said services.

13. A method as recited in claim 1 wherein the step of generating a new user form includes the sub-steps of:
   querying an agent for each of said plurality of services available on said computer system to obtain default settings for each of said sets of service parameters,
   transferring said default settings obtained from each queried agent to said new user form, and
   transferring said default values from said selected user template to said new user form, said default values from said selected user template overriding said default settings obtained from each queried agent where conflicting.

14. An account database data structure embodied in a computer-readable medium for use within a computer system that is integrated with a plurality of services including an electronic mail service and a web publishing service, said computer system having a plurality of users being represented in said account database data structure, said account database data structure comprising:
   a plurality of sets of header information parameters, each set of header information parameters being associated with one of said users and arranged to uniquely identify one of said users;
   a plurality of sets of agent privileges, each set of agent privileges being associated with one of said users and arranged to indicate privileges within one of said services;
   a plurality of sets of electronic mail service parameters, each set of electronic mail service parameters being associated with one of said users and arranged to uniquely identify one of said users, each set of electronic mail service parameters further arranged to indicate a desired setup for said electronic mail service for one of said users; and
   a plurality of sets of web publishing service parameters, each set of web publishing service parameters being associated with one of said users and arranged to indicate a desired setup for said web publishing service.

15. An account database data structure as recited in claim 14 further comprising:
   a plurality of sets of directory service parameters, each set of directory service parameters being associated with one of said users and arranged to indicate a personnel record for said user; and
   a plurality of sets of system service parameters, each set of system service parameters being associated with one of said users and arranged to indicate a desired setup for said system service.

16. An account database data structure as recited in claim 14 wherein each set of header information parameters includes a unique user identification and a real user name.

17. An account database data structure as recited in claim 14 wherein each set of electronic mail service parameters is arranged to include a postmaster link to a single separate group of global electronic mail settings.

18. A computer program product comprising a computer-usable medium having computer-readable program code embodied thereon for automatically enabling users of a computer system for use of a plurality of services available on said computer system, each of said plurality of services being associated with a set of service parameters that define a level of service for one of said users of said computer system, said computer program product comprising computer-readable program code for effecting the following steps within a computer system:
   selecting a user template for a particular user of said computer system, said user template indicative of the type of said particular user and including default values for said sets of service parameters for each of said services available;
   generating a new user form for said particular user based upon said selected user template and including said default values from said selected user template;
   creating a user account for said particular user for each of said services available on said computer system using at least in part said default values from said new user form; and
   enabling each of said services for said particular user so that said user may communicate with and utilize each of said services on said computer system.

19. A computer program product comprising a computer-usable medium having computer-readable program code embodied thereon for automatically enabling users of a computer system for use of an electronic mail service and a web publishing service available on said computer system, each of said services being associated with a set of service parameters that define a level of service for one of said users of said computer system, said computer program product comprising computer-readable program code for effecting the following steps within a computer system:
   selecting a user template for a particular user of said computer system, said user template indicative of the type of said particular user and including default values for said sets of service parameters for each of said services available;
   generating a new user form for said particular user based upon said selected user template and including said default values from said selected user template;
   creating an electronic mail user account for said particular user for said electronic mail service available on said computer system using at least in part said default values from said new user form;
   creating a web user account for said particular user for said web publishing service available on said computer system using at least in part said default values from said new user form; and
   enabling each of said services for said particular user so that said user may communicate with and utilize each of said services on said computer system.

20. A computer system for automatically enabling users for use of a plurality of services available on said computer system, each of said plurality of services being associated with a set of service parameters that define a level of service for one of said users of said computer system, said computer system comprising:
   means for selecting a user template for a particular user of said computer system, said user template indicative of the type of said particular user and including default values for said sets of service parameters for each of said services available;
   means for generating a new user form for said particular user based upon said selected user template and including said default values from said selected user template;
   means for creating a user account for said particular user for each of said services available on said computer system using at least in part said default values from said new user form; and
   means for enabling each of said services for said particular user so that said user may communicate with and utilize each of said services on said computer system.

* * * * *